United States Patent [19]

Manser et al.

[11] Patent Number: 5,364,651
[45] Date of Patent: Nov. 15, 1994

[54] PROCESS AND APPARATUS FOR PRESSING AND DRYING PASTA

[75] Inventors: Josef Manser, Uzwil; Egger Friedrich, Niederuzwil; Werner Seiler, Zueberwangen; Heinz Resch, Flawil, all of Switzerland

[73] Assignee: Buehler AG, Uzwil, Switzerland

[21] Appl. No.: 30,499

[22] PCT Filed: Aug. 20, 1992

[86] PCT No.: PCT/CH92/00166
§ 371 Date: Apr. 1, 1993
§ 102(e) Date: Apr. 1, 1993

[87] PCT Pub. No.: WO93/03620
PCT Pub. Date: Apr. 3, 1993

[30] Foreign Application Priority Data

Aug. 21, 1991 [CH] Switzerland .................. 454/91

[51] Int. Cl.⁵ ............... A21D 6/00; A21C 11/00; F26B 15/00
[52] U.S. Cl. .................. 426/451; 99/483; 425/315; 425/377; 426/467; 426/516
[58] Field of Search ........... 426/451, 458, 467, 473, 426/496, 516; 99/483; 425/72.1, 315, 377, 445

[56] References Cited

U.S. PATENT DOCUMENTS

| | | |
|---|---|---|
| 4,126,706 | 11/1978 | Hilton .................. 426/516 |
| 4,469,711 | 9/1984 | Sletzer .................. 426/451 |
| 4,775,542 | 10/1988 | Manser et al. .......... 426/458 |

FOREIGN PATENT DOCUMENTS 1176842 10/1984 Canada .
0066661 12/1982 European Pat. Off. .
2043860 10/1980 United Kingdom .

OTHER PUBLICATIONS

International Search Report PCT/CH92/00166.

Primary Examiner—George Yeung
Attorney, Agent, or Firm—McAulay Fisher Nissen Goldberg & Kiel

[57] ABSTRACT

The inventive method and apparatus suggests guiding the pasta directly into a drying climate after exiting from the die. Pasta strands of short goods are fed directly into the drying device from the extrusion die. The pasta strands can be cut either directly at the extrusion die or subsequently into packaging lengths after drying by means of an additional cutting device. It is possible to operate only the initial drying in this way, particularly to heat up the goods and then to carry out the final drying in a manner known per se, e.g. by portions. However, it is also possible to carry out the drying in its entirety, i.e. the pre-drying and final drying, according to the invention, particularly for short goods. The goods can be intensively dried at previously unaccustomed temperatures of 90° C. to 120° C., particularly during final drying from 15% to less than 13% product moisture. Further, it is preferably suggested to provide a cutting device for the pasta strands directly at the die, by means of which short as well as long goods substantially of packaging length can be cut. When the packaging length of the long goods must be cut accurately, a second cutting device can be provided after drying, which allows a particularly great flexibility of the installation for the production of different products ranging from longer goods to the shortest goods.

40 Claims, 15 Drawing Sheets

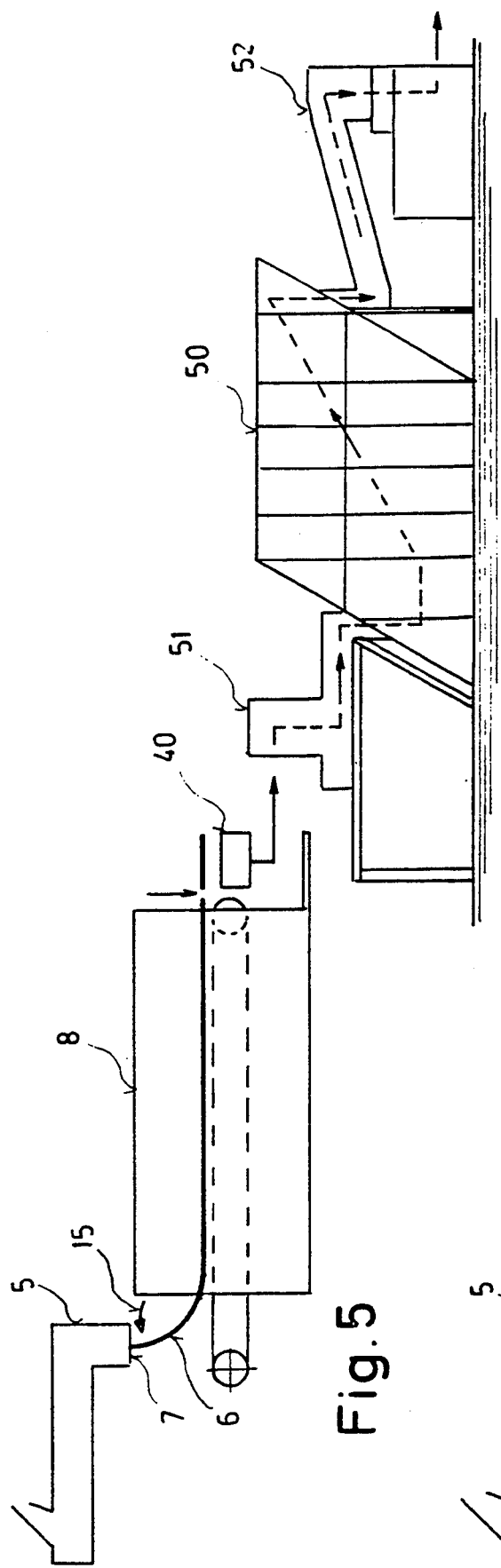
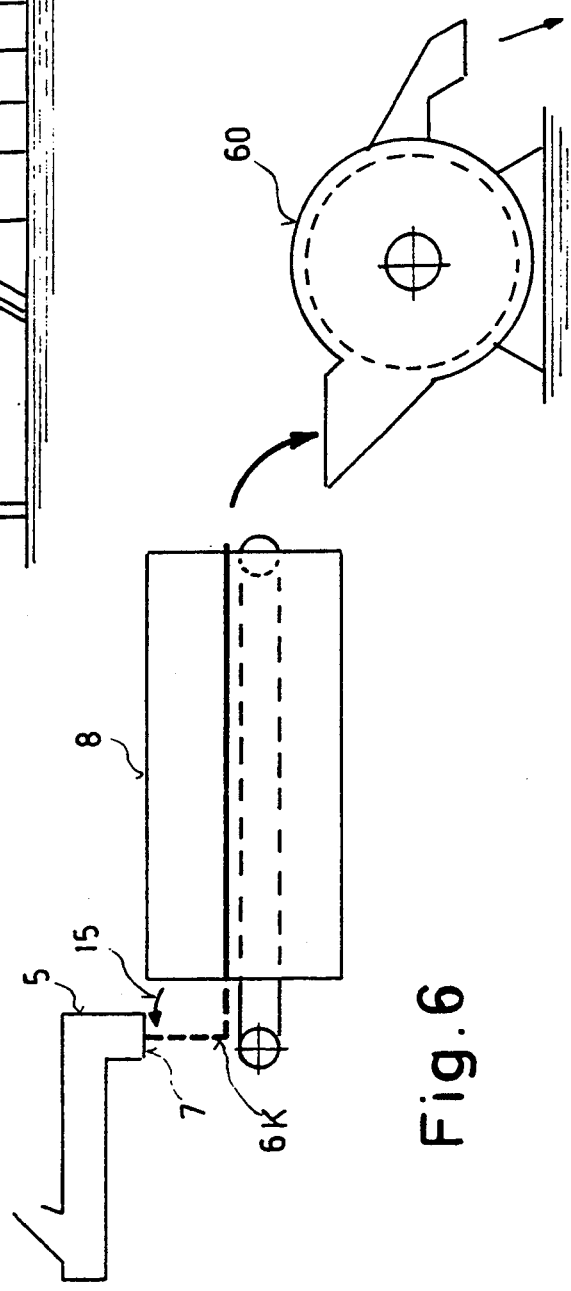

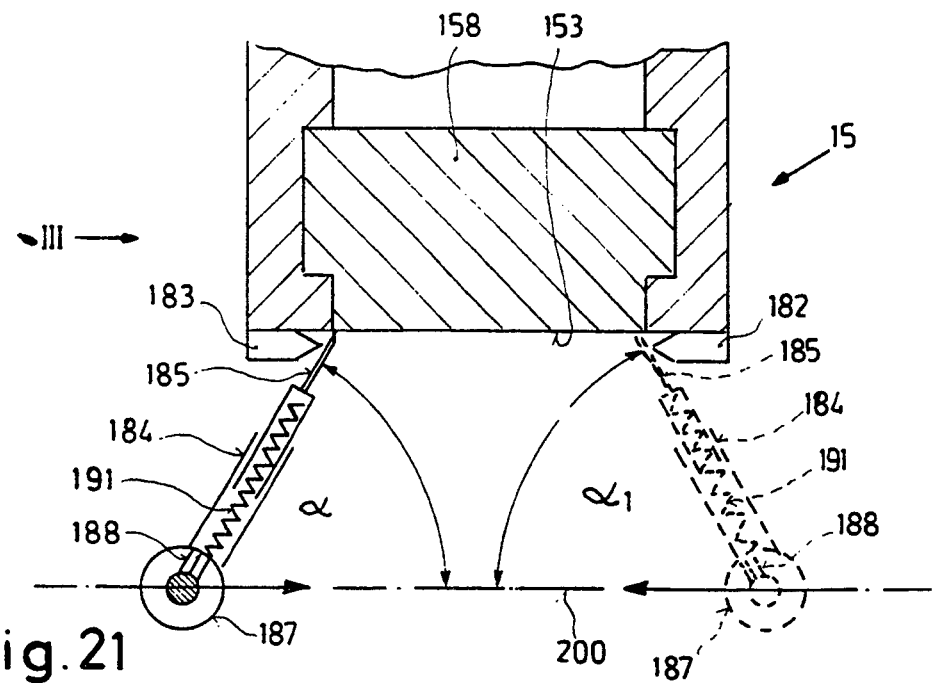
Fig. 21
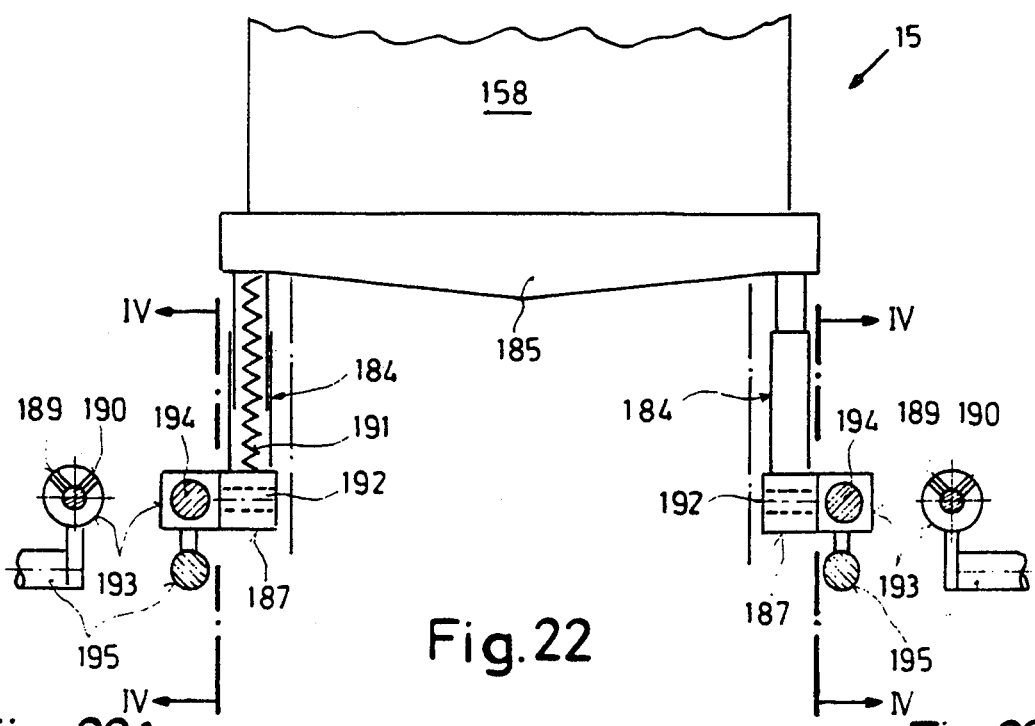
Fig. 22.1  Fig. 22  Fig. 22.1

PROCESS AND APPARATUS FOR PRESSING AND DRYING PASTA

BACKGROUND OF THE INVENTION a) Field of the Invention

The invention is directed to a process and apparatus for pressing and drying pasta by extrusion via a die and subsequent drying in a continuous flow drier.

b) Background and Related Art

The principal distinction between processes and apparatuses for the production of so-called long goods, e.g. spaghetti, and processes and apparatuses for the production of so-called short goods, e.g. horns and other pasta cut to short length, consists in that they can be treated in further processing as bulk goods.

On an industrial scale, long goods, i.e. spaghetti, are still produced in that the pasta strands which are delivered continuously from the mold or die are transferred to a rod, cut to a predetermined length on these rods, and guided into a drier on these rods. The pasta strands are then cut to the desired length of spaghetti following the drier.

Short goods are guided through the drying means in a manner known per se with a proportionate mechanical expenditure on receiving and transporting members and liftover devices. The advantage over long goods, e.g. spaghetti, consists in that these short goods can be cut to length already at the extrusion die.

Therefore, the problem arises for both short and long goods of reducing the mechanical outlay.

In principle, technical solutions which are costly and possibly also complicated, but which are also spatially compact and therefore attractive, are justified for large-volume industrial fabrication. But within the framework and idea of a decentralization of foodstuffs manufacturing and the reduction in production output which this entails these solutions may be too complicated and expensive.

Tendencies in technical development over the last decades led toward gigantism with all of the ecological disadvantages recognized today. For this reason, thinking is changing direction again away from gigantism toward the goal of small operations in situ so that marketing organization with all the associated transportation problems and loading of the environment can likewise be reduced in a corresponding manner.

It is also in view of these considerations that the present Inventor has set himself the above-mentioned task.

Regarded in a purely physical sense, pasta products can be dried e.g. within a half hour.

The present Applicant achieved a first major breakthrough with the idea of complete control of a section-by-section drying climate control and the simultaneous use of a drying temperature of 80° C. to 100° C. for long pasta. It was possible to reduce the drying time to two to six hours and even to one hour, at least in laboratory tests. However, all findings confirmed that in the case of long goods the drying technology not only causes more problems, but also requires special general conditions. Yet only the method of drying long pasta products on rods achieved commercial success. Ideas for drying long goods without the use of rods have not had practical success for technical reasons. In principle, the technical means must conform to the requirements of the biological, biochemical and physical laws of the product to be processed.

The drying of pasta aims not only at the inner quality of the product, e.g. cooking properties, texture (e.g. al dente) or color, tensile strength, etc., but especially also at obtaining the straightest possible shape of an individual piece of long goods, particularly spaghetti. This is not so much because of consumer requirements as that it constitutes a basic precondition for the smooth functioning of the automatic packaging machinery.

The product is highly flexible and still deformable immediately after pressing and can therefore be hung on rods in the well-known U-shape with the use of simple means and can be left in this position until final drying. Long, straight pasta products are obtained in this way provided no gross errors are made in drying.

The problem of drying long goods on rods in itself is solved in technical respects.

A problem resulted when the drying temperature was increased in that substantially greater demands were made on the work materials of the operating arrangement as well as the mechanical means, particularly the mechanically moved parts, which increased the cost of producing an entire pasta line.

Short pasta or short goods have become associated over time with a special characteristic.

Short goods are pressed via a circular die and cut to the desired packaging length with a rotating knife directly at the die. After they are cut, the short goods usually fall into a conveyor which lifts them over and feeds them to a rotary distributor which spreads out the goods in a uniform bulk layer on the drying surface of a vibrating pre-drier.

After the vibrating pre-drier the short goods already have considerable stability of shape so that they can be dried to a moisture content of less than 13% with greater layer thicknesses on different drying belts.

In contrast, long goods are not cut directly at the die, but only after the pasta strands are hung on the rods in the typical U-shape at a distance from the extrusion die of approximately 0.5 to 1.5 m depending on the specific construction, resulting in a constant alternation between hanging and cutting, etc. The goods then remain on the rods, often until immediately before the definitive cutting of the dried product for the packaging length. The pasta remain on the rods in a stacker for many hours particularly to achieve good stabilization. The external shape seems almost to compel these particular drying techniques. Formerly, it was unthinkable to dry the long goods as a bulk layer.

SUMMARY OF THE INVENTION

The novel invention allows a number of particularly advantageous constructions. Thus, for example, immediately after the definitive shaping the pasta can be guided into a climate which is controlled by control means, the temperature of the goods being increased from the pressing temperature to more than 70° C., preferably to more than 80° C.

After pre-drying, the long goods are cut as hot strands at a temperature of at least 70° C. either into drying lengths or into finished product lengths and dried in a warm state in a mass drying process, known per se, or guided into the main drier.

In a particularly preferable manner the pasta strands for long goods are dried to a sufficient stability of shape to less than 28% moisture, preferably less than 125% moisture [sic] and cut in a moist state. The cut product is then completely dried, e.g. by portions, to less than 13% product moisture.

It is advantageous that the drying be made up of alternate heating sections and drying sections. The heating of the pasta can be effected either with hot air or by microwave energy with subsequent intensive drying of the pasta strands.

In another advantageous embodiment form the pasta is stabilized after final drying by microwave.

However, it is particularly important that the drying be effected in a greater number of drying stages. Each stage should have its own controllable climate management and its own circulating air system. It is suggested that the pasta be predried at a product temperature of more than 70° C. and up to 80° C.

Tests have confirmed that the principle drying of the pasta products can be effected at temperatures of 80° C. to 150° C., particularly preferably at 90° C. to 125° C.

The temperature can be increased slightly to more than 100° C., depending on quality, with a product moisture of less than 18%, but especially less than 15%, without harmful side effects, particularly without a puffing effect. Accordingly, it is possible for the first time to maintain the initially very rapid drying effect until final drying and accordingly to reduce the drying time to previously unaccustomed short periods of time.

The product can be heated by means of microwaves and/or hot air and/or hot steam.

In another construction, the product temperature is reduced in stages to below 60° C. during the final drying and the heat stored in the product can be utilized for changing the water into steam and accordingly for accelerated drying.

It is possible to work with a substantially lower drying temperature of the air particularly when microwaves are used for heating the pasta strands, since the water can be guided off easily in the form of steam when the heat is removed.

The pasta strands (for long goods) are preferably guided so as to be completely straight and horizontal until severed and the drying air is guided vertically at a right angle to the pasta strands. The air speed is preferably controllable in such a way that the pasta strands are fluidized.

According to another construction idea, the pasta strands are directed at least via a first product intake means as well as a product discharge means in the drying area. The product intake means work without pushing or pulling and the product discharge means exert a slight tensile force on the pasta strands. The length cutting device should move at the speed of the pasta stands during the cut so that no recoil force is exerted on the pasta strands.

The invention allows a number of advantageous constructions. The pasta are preferably guided immediately after final shaping into a climate which is controlled by control means and the temperature of the goods is increased from the pressing temperature to more than 70° C., preferably to more than 80° C.

For industrial fabrication it is particularly advantageous when the definitive shaping is effected in such a way that a horizontally moved strand is formed which is guided directly into a heating and drying climate. Thus, bending forces can be prevented from acting on the relatively cold/rigid pasta strand immediately after extrusion. Accordingly, it is now also possible to provide much longer cut lengths, e.g. when the principle drying is effected on rods, so that the entire drier is shortened and can be conceived in the manner of a tunnel or continuous-flow oven in a single stage.

In another construction, the pasta strands can be cut while still moist and then dried by portions. In another embodiment form, the pasta strands are dried until just reaching stability of shape without cutting and are then cut to packaging length and completely dried by portions and the product is stabilized in column silos and stored until packaging.

According to another construction idea, the pasta are guided horizontally and the drying air is guided vertically transversely to the pasta. The air speed is preferably selected at a high enough rate so that a fluidization of the pasta is effected, the pasta being guided via a continuous conveyor, preferably an air-permeable endless conveyor belt or air-permeable vibrating transporting units.

The invention is further directed to a pasta line for the production of long goods and has a pasta press and a continuous-flow drier with a continuous conveyor system for pasta and, if long pasta are being produced, also a subsequent length cutting machine.

In another particularly advantageous construction a pasta strand cutting device is arranged at the extrusion die, which pasta strand cutting device has cutting knives with length cutting directions toward the extrusion die.

The continuous-flow drier can be constructed in two or more layers.

In a particularly advantageous manner, the drier is conceived in such a way that it has a large number of drying sections with individually controllable climates as well as circulating air guidance, preferably with the Turbo-Thermatic system.

Another interesting construction consists in that the continuous conveyor system is formed at least partially by vibrating transporting units which preferably have longitudinal bulkheads for the longitudinal guidance of the pasta strands.

Further, the novel invention also allows a whole range of special constructions in a surprising manner. The cutting device is preferably constructed with a control device in such a way that the cutting intervals are controllable.

Thus, for example, for drying pasta strands, the cutting device can be used for the starting cut as well as the final cut.

In the case of short goods, the cutting interval must be selected so as to correspond to the discharge speed of the goods from the die as well as to the desired length of the goods.

Further, the cutting device can be constructed as a transverse cutting device or as a double-cutting device. A linear cut can accordingly be achieved at extremely great speed.

Further, it is suggested that the length of the extrusion die approximately corresponds to the usable width of the vibrating drier, product intake means being arranged below the extrusion die for direct insertion of the product into the continuous-flow drier.

The continuous-flow drier can have two or more fluid beds in the continuous feed direction. These fluid beds can preferably be constructed as a vibrating transporting unit. The continuous-flow drier is divided into a large number of climate zones, each having its own circulating air system.

In another preferred embodiment form, the continuous-flow drier is constructed in multiple layers.

Further, it is possible in the case of short goods to select a rotary or drum drier, known per se, as final drier and to arrange it downstream of the continuous-flow drier.

Further, in another particularly advantageous construction, a length cutting machine can be provided in the region of the final drier for sawing long pasta into the desired packaging length. The pasta line in this case is constructed according to the Swiss Application No. CH 02292/91-8 (TW 108) which is referred to in its entirety.

Further, a discharge device can be arranged prior to the length cutting machine so that the short goods which are cut directly at the die are discharged from the line before passing the length cutting machine.

The novel invention is further directed to a process for the production of pasta in which the pasta are pressed with a pasta moisture of approximately 28% to 35%, dried and cut to the desired packaging length. The pasta can be pressed through a long die and dried in a continuous fluid bed layer.

Surprisingly, a genuine combinatorial effect results between the long die and continuous fluid bed in that the discharge speed of the goods at the die directly influences the continuous-flow speed through the fluid bed in a favorable manner.

In the case of short goods, the wide feed brings about a distributing effect on the fluid bed and accordingly an automatic compensation of fluctuations in throughput.

In another preferred construction, the pasta are pressed via a long die having a length cutting device, dried as a bulk layer in a tunnel drier, and discharged as short goods or cut into desired packaging lengths as long goods via a length cutting device.

It is possible in the case of short goods that the goods are dried to less than approximately 20% in the continuous-flow drier until stability of shape is achieved. The final drying can then be effected in a drum drier.

The initial drying is preferably carried out at a product temperature of 80° C. to 100° C. and the final drying is preferably carried out at 100° C. to 150° C., particularly preferably at 100° C. to 125° C.

As already indicated, the advantage of the invention consists in the possibility of producing pasta of different shapes with substantially the same installation by simplifying the mechanical apparatus.

For a better understanding of the present invention, reference is made to the following description and accompanying drawings while the scope of the invention will be pointed out in the appended claims.

BRIEF DESCRIPTION OF THE DRAWINGS

FIG. 5 shows a pasta line with press, drier, long goods stacker, and packaging machine;

FIG. 6 shows a pasta line for short goods with a drum drier as final drier;

FIG. 21 is a partially schematic view of a cutting device according to the invention for a long die according to FIG. 12;

FIG. 22 shows the cutting device of FIG. 21 as seen in direction III (FIG. 21);

FIG. 22.1 shows a detail of the cutting device of FIGS. 21 and 22.

DESCRIPTION OF THE PREFERRED EMBODIMENTS

Figure 1:
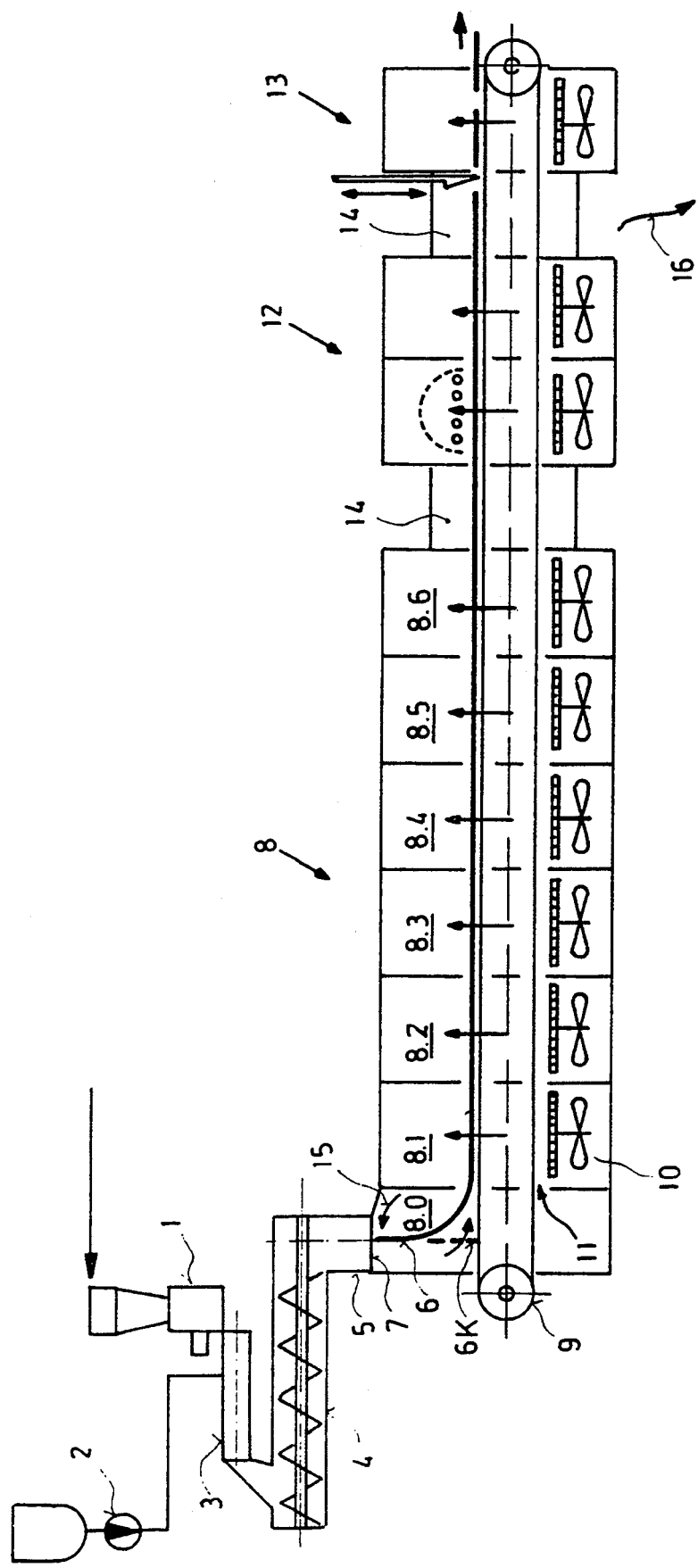
FIG. 1 shows a long goods line without rods.

FIG. 1 is referred to in the following. The raw material is fed as dry component via a metering device 1 and as liquid component via a liquid metering device 2 to a kneading device 3 and a pressing screw 4 and a press head 5 from which the pasta strands 6 or short goods 6k are formed by an extrusion die 7 and are guided directly through a drier 8.

In the drier, a conveyor system 9 guides the pasta strands continuously through a predetermined number of drying sections 8.1, 8.2, etc.

Each drying section has an air guidance arrangement, described below with reference to FIG. 11, for ensuring climate guidance and control which is indicated symbolically in this drawing by a ventilator wheel 10 and a heating element 11.

Figure 10:
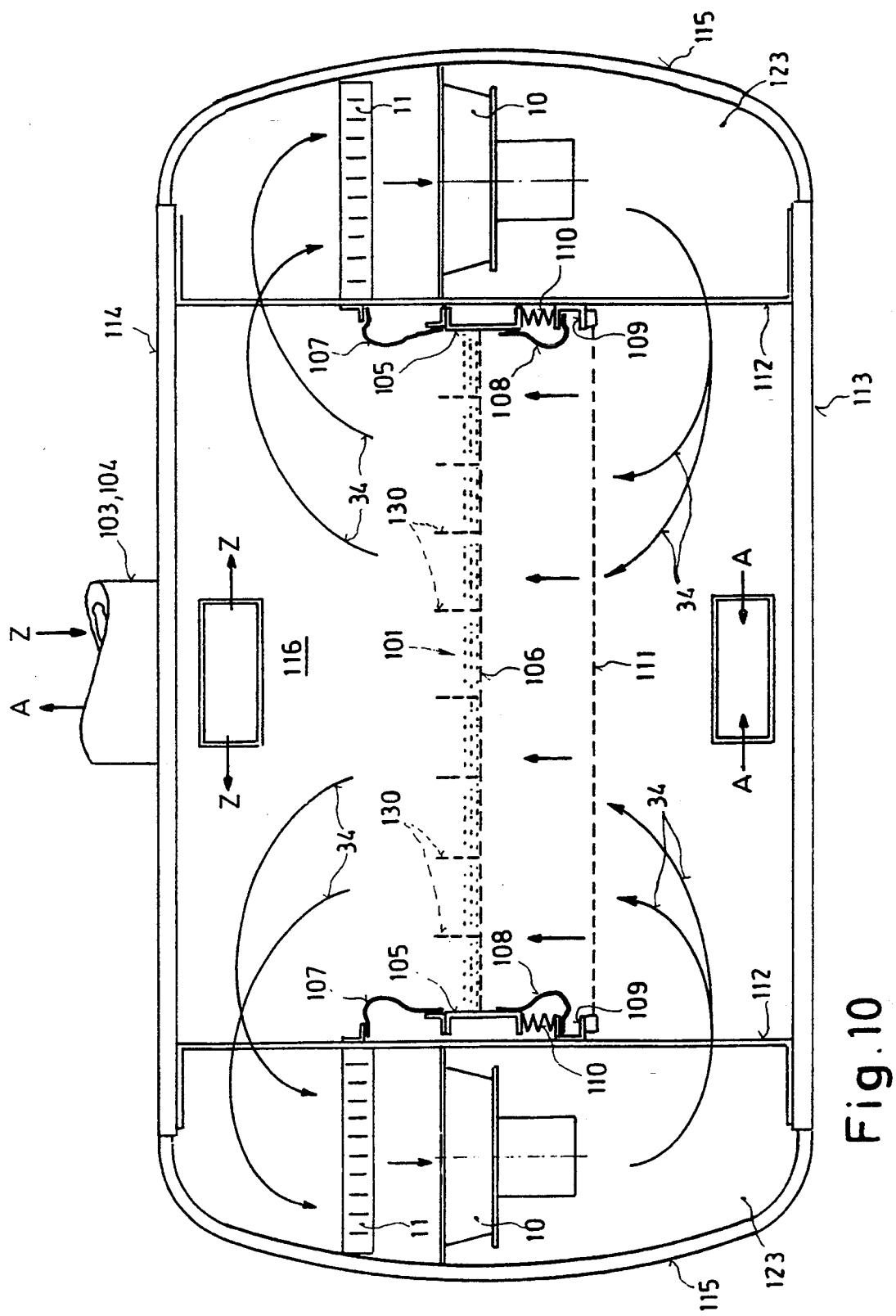
FIG. 10 is an enlarged, partially schematic view of a cross section through the drying line of FIG. 9.

The conveyor system 9 can be a perforated endless belt (not shown) or a vibrating conveyor which is described in the following with reference to FIG. 10. In both cases, an air flow as shown in FIGS. 10 and 11 is advantageously provided. The air flows substantially vertically through the endless belt or through the vibrating conveyor.

A stabilizer 12 is arranged subsequent to the drier 8.

If the stabilizer 12 is constructed as a microwave stabilizer, a lock 14 constructed as a microwave lock is provided between the drier 8 and stabilizer 12 and between the stabilizer 12 and a length cutting device 13. This length cutting device 13 is arranged subsequent to the second lock 14 as seen in the conveying direction of the product.

A cutting device at the extrusion die 7 for short or long pasta is designated by reference number 15 and arrow 15 and described in the following. Incorrectly extruded goods can be severed with such a cutting device at the start on the one hand or the pasta strands can be cut with a uniform end at the end of a batch production or pasta of any length can be cut.

The arrow 16 indicates that short goods and long goods can be produced by the same production line, the short goods being cut by the transverse cutting device 15 and discharged prior to the length cutting device 13 according to arrow 16.

Figure 2:
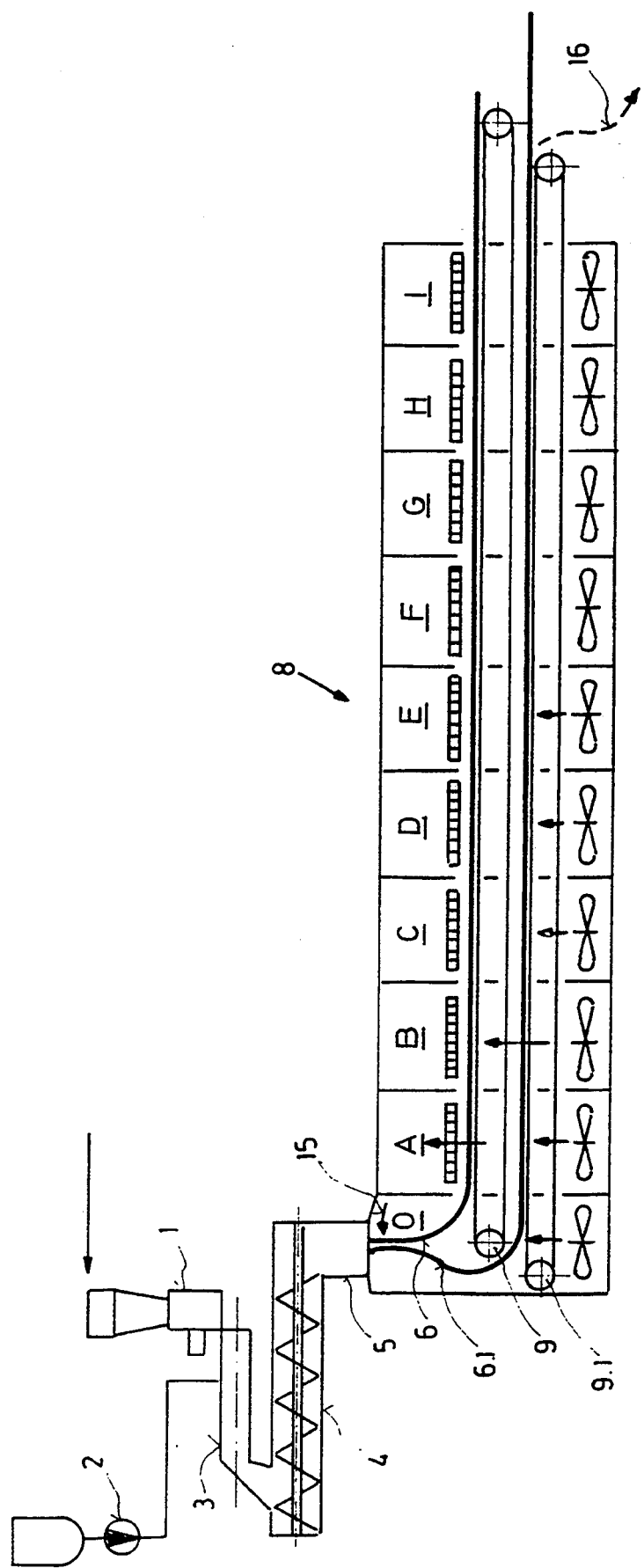
FIG. 2 shows a long goods line with two stages.

FIG. 2 can be viewed in a manner analogous to FIG. 1, but shows a two-stage construction with an upper conveyor system 9 as well as a lower conveyor system 9.1 on which the partial strands 6 and 6.1, respectively, are guided through the drier.

However, FIG. 2 can also be constructed in such a way that e.g. long goods are produced on the upper belt and short goods on the lower belt so that short or long pasta can be produced on the same line without conversion work.

Figure 3:
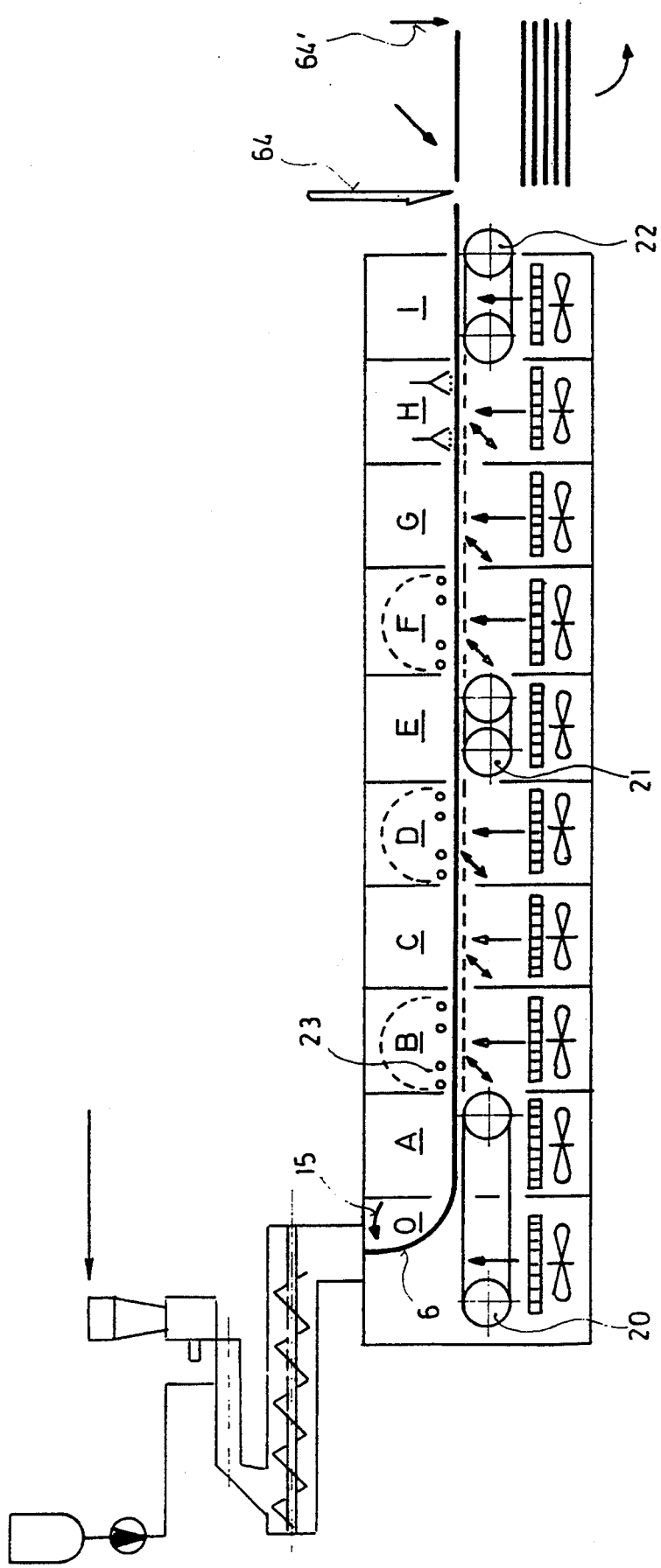
FIG. 3 shows another embodiment example of a single-stage pasta line according to the invention.

FIG. 3 shows a very compact construction of a complete installation with pasta preparation and drying of the pasta strands.

As in FIG. 1, the drier is also divided into a large number of individual climate zones A, B, C, D, etc. in FIG. 3. A microwave heating stage 23 is provided in the climate zones B, D, F. Also, a product intake means, e.g. in the form of a conveyor belt 20, a product discharge means 22, and a directing belt 21 are arranged in the central region.

The product discharge means which can likewise be a conveyor belt exerts a slight tension on the pasta strands. It is provided in all variants that a large number of pasta strands is guided through the installation in a carpet-like manner along a width of 1 to 2.5 m. A plurality of pasta strands can also lie one on top of the other on the same conveyor system when there is a sufficient air through-flow.

The drying air is guided in the region of a fluid bed in circulating air operation, as described in the following, and as a result of high speed or a corresponding ascending force for the pasta guided therein all pasta strands are carried through the different drying zones in the manner of a fluid bed. A fluid bed type drying is also shown and described in the Swiss Patent No. 615 269 (also U.S. Pat. No. 4,126,945).

In an advantageous manner, the vibrating transporter described in the following also has longitudinal guides, also known as longitudinal bulkheads, which provide longitudinal guidance for the pasta strands or short goods.

Figure 4:
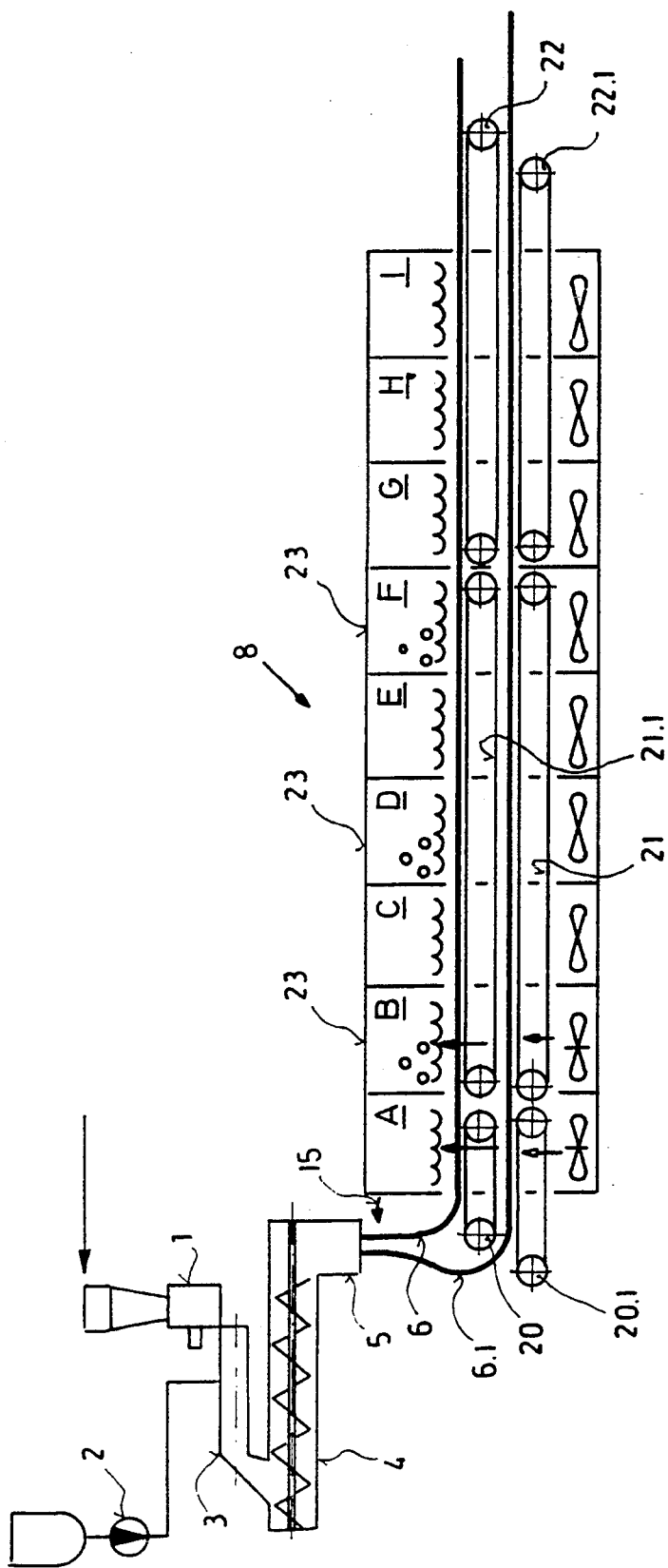
FIG. 4 shows another embodiment example of a two-stage pasta line according to the invention.

The solution according to FIG. 4 can also be conceived in a manner similar to FIG. 1, but constitutes a two-stage construction similar to the line of FIG. 2 with an upper conveyor system 9 and a lower conveyor system 9.1 on which the pasta strands 6 and 6.1, respectively, are guided through the drier.

The conveyor belts mentioned above which—as already mentioned—are perforated to enable the aforementioned through-flow of air are shown in FIGS. 1, 2 and 4. However, it is also possible to replace this with the vibrating conveyor described in the following.

Like the drier in FIG. 2, the drier in FIG. 4 is divided into a large number of individual climate zones A, B, C, D, etc. A microwave heating stage 23 is provided e.g. in climate zones B, D and F. Such microwave heating stages are determined depending on the particular case according to the technical expertise of the technician.

Product intake means and product discharge means are provided for long goods in the form of a conveyor belt 20 and 20.1, respectively, for the product intake means and in the form of conveyor belts 22 and 22.1, respectively, for the product discharge means. Further, a directing belt 21 and 21.1, respectively, is provided in the central region. The product discharge means exert a slight tension on the pasta strands.

For long goods, it is further provided in all variants that a large number of pasta strands can be guided through the installation in a carpet-like manner across a width of 1 to 2.5 m. More pasta strands can also lie on top of one another on the same conveyor system when there is a sufficient through-flow of air and can be prevented from sliding off at the sides by the aforementioned longitudinal guides (longitudinal bulkheads).

Figure 7:
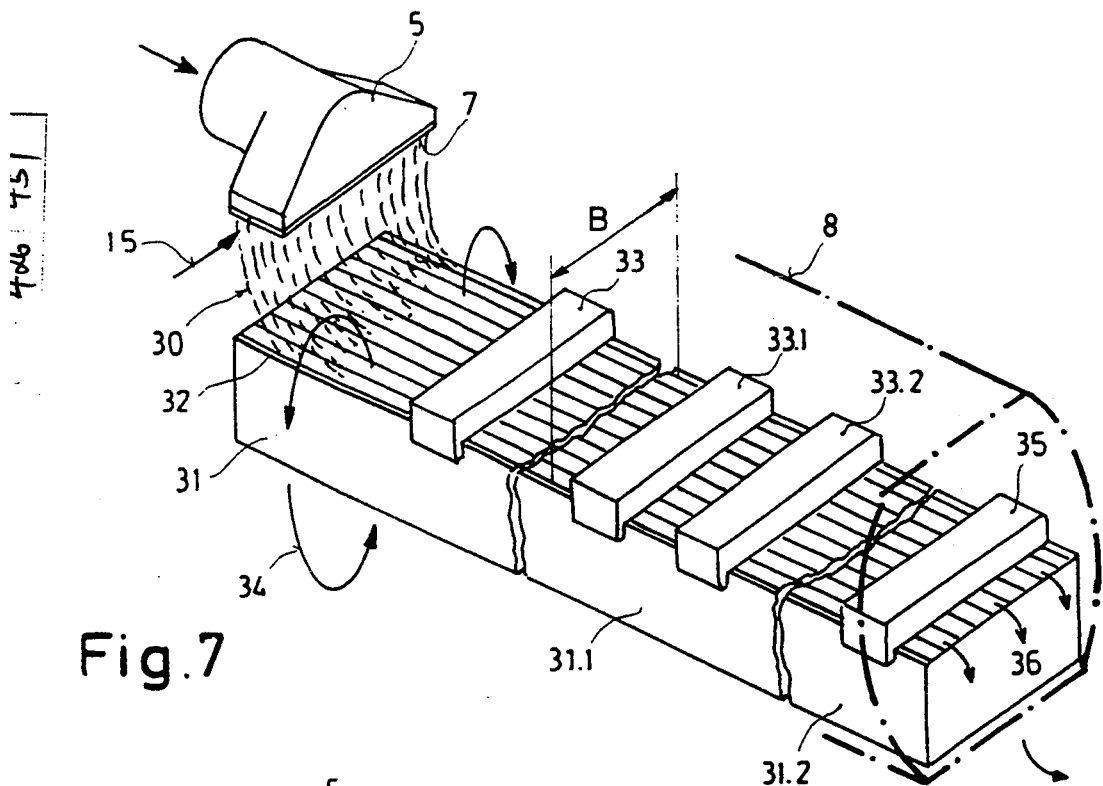
FIG. 7 is a partially schematic view of an extrusion die as long die for short goods with a subsequent drying line.

Reference is made in the following to FIG. 7 which shows a short goods line. After being cut by the transverse cutting device 15 directly at the die 7, the short goods 30 fall directly onto a whirl drier 31, described in the following, which has approximately the same width as the long die 7. The whirl drier 31 has the longitudinal bulkheads 32 described above (also known as longitudinal guides) which provide longitudinal guidance for the short goods 31 so that the goods are not concentrated on one side.

The whirl drier 31 has an optional heat-up stage 33 for increasing the goods temperature. Such a heat-up stage can be e.g. an infrared stage.

The drier 8 has the typical external form shown and described in a PCT Application of the present Applicant, CH92/00060 (date of application: 4/1/92). For this reason the construction of this system is not described in its entirety in the present application and reference is made to the PCT application mentioned above.

As shown in FIGS. 1 to 4, the drier has a plurality of drying stages so that the drying can be kept under complete control with respect to time as well as drying climate.

Figure 11:
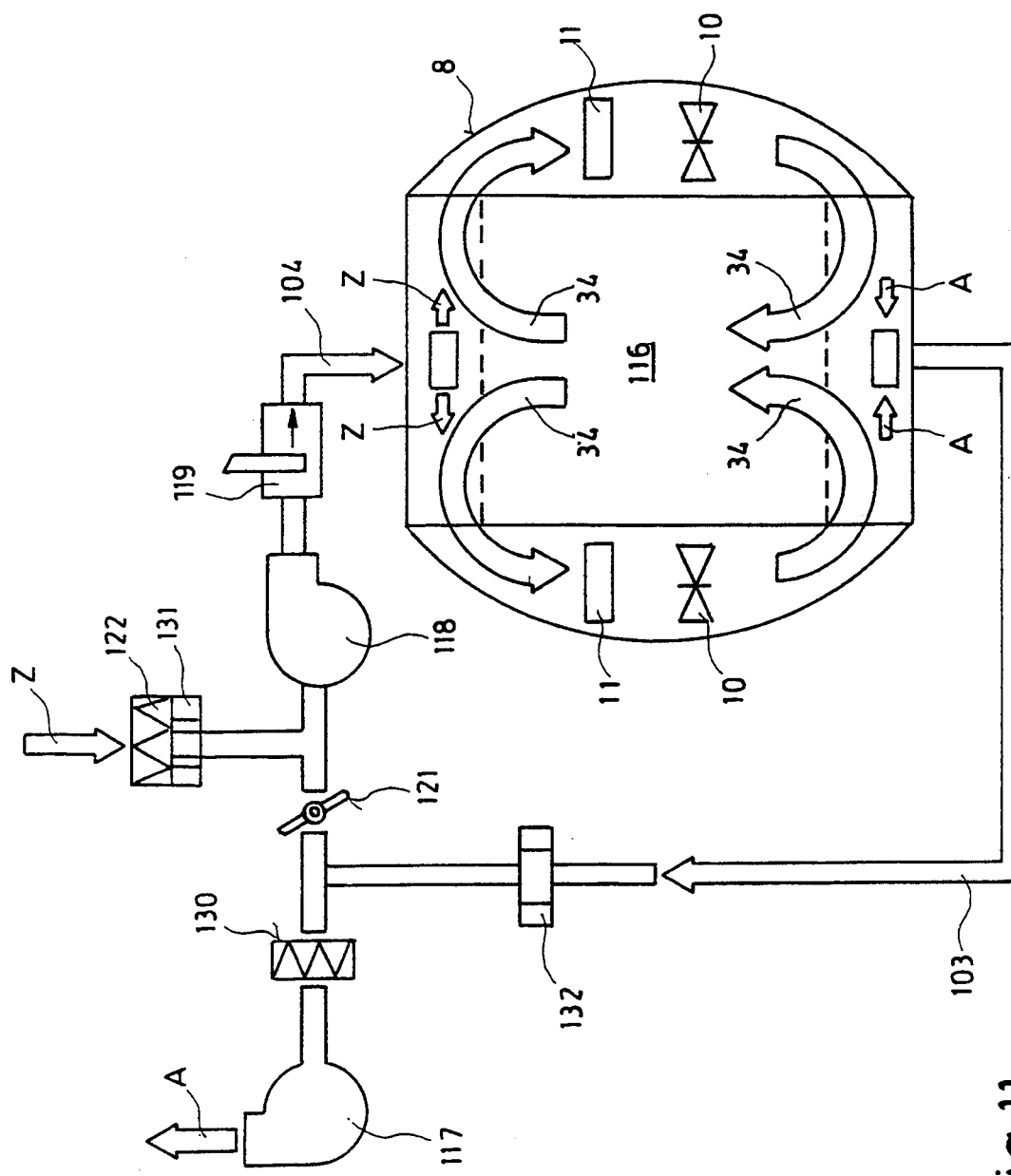
FIG. 11 shows a schematic view of the air paths of a drying line with a cross section of the drying line similar to FIG. 10.

In FIG. 7, a principle drier 31.1 and a final drier 31.2 are provided in addition to the whirl drier 31 which is associated with the aforementioned optional heat-up stages 33 and its own climate section according to FIGS. 10 and 11.

A stabilizing stage for the dried goods is designated by reference number 35. Stabilizing the pasta refers to a remoistening of the outer layer of the pasta cross section after the drying process to prevent subsequent breakage.

The short goods have a moisture of less than 13% at the discharge end 36 and can subsequently be stacked or packaged directly.

Figure 8:
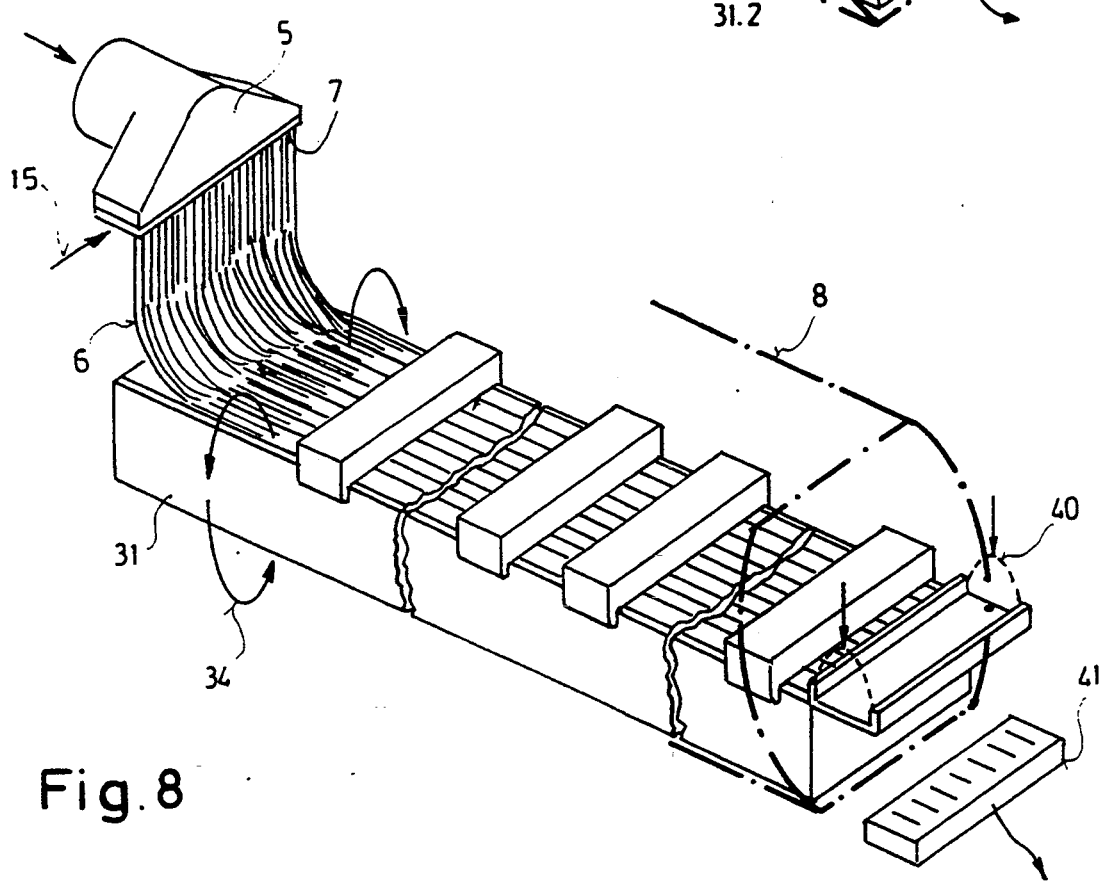
FIG. 8 is a partially schematic view of an extrusion die as long die for long goods with a subsequent drying line.

A production line for long goods similar to FIG. 7 within the scope of the inventive idea is shown in FIG. 8. The pasta strands are cut to a uniform length by the transverse cutting device 15 at the start and at the end of an operation batch. However, the packaging length is first produced at the outlet of the drier 8 by a cutting device 40 shown here as a guillotine and the packaging lengths are fed in a transfer mold 41 for stacking in containers or for packaging.

FIG. 5 shows the solution of FIG. 8 with a subsequent container stacker 50, the cut goods being transferred to the latter in an ordered manner in packaging lengths via a transfer device 51 and packaged as needed.

As shown in FIG. 6, short goods can also be dried in the drier 8 only until stability of shape is achieved up to approximately 20% moisture and subsequently completely dried to storage moisture in a drum drier 16 which is shown and described in a European Patent No. 0 142 652 of the present Applicant.

Of course, it is also possible to arrange a stacker 50 for long goods or short goods in a line subsequent to a drier 8 and 31, 31.1, 31.2. Short goods are discharged in the direction of arrow 16 in FIG. 1 prior to the length cutting device 40 for intermediate storage in a short goods stacker arranged parallel to the container stacker 50.

But short goods which are only partially dried can also be completely dried in a drum drier 60 arranged parallel to the container stacker 50.

The advantage of the pasta lines according to the invention consists in that long or short goods can be produced with one and the same drier with suitably selected throughput capacity and climate, which allows an entire production installation to be operated at an optimum level.

In another construction idea the goods temperature can be reduced in stages to less than 60° C. during the final drying and the stabilization of the pasta can be effected via microwaves.

The type and manner of drying as shown with the circulating air system of FIGS. 10 and 11 has been shown and described in a European Patent No. 0 129 892 B1 of the present Applicant and is known commercially as "TURBO THERMATIK". For this reason, this published patent and its application are referred to as concerns this circulating air system.

Figure 9:
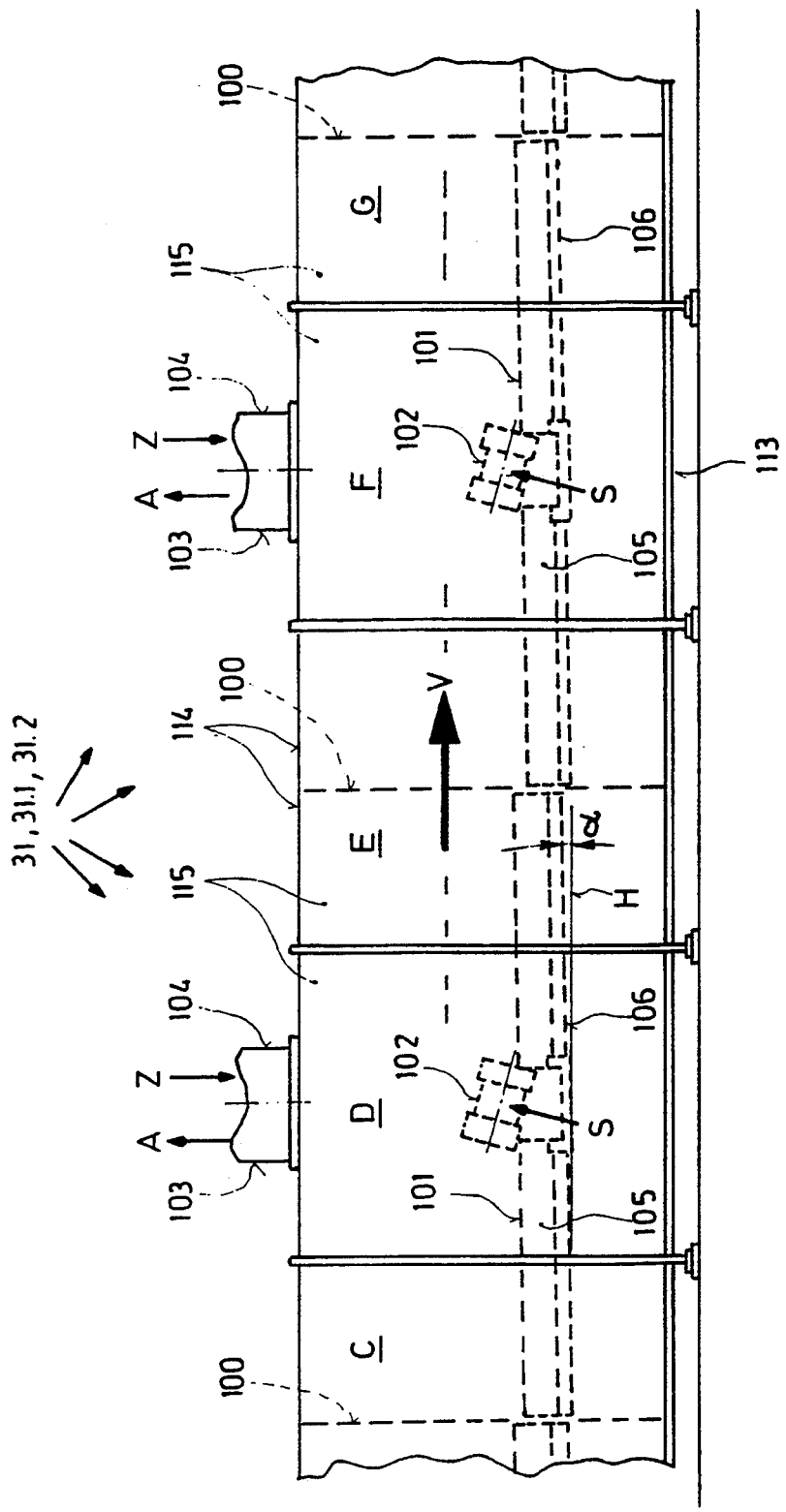
FIG. 9 is an enlarged, partially schematic view of a longitudinal section from a drying line, according to the invention.

FIG. 9 shows an enlarged view of a section from the whirl drier 31 and 31.1, respectively, 31.2 shown in FIGS. 7 an 8 in which vibrating oscillating channels are supported in a springing manner as shown in the following with reference to FIG. 10 so that the vibrating oscillating channels 101 are moved in the direction of arrow S by means of vibrating elements 102 at the oscillating channels 101, so that the product is conveyed in the vibrating oscillating channels in conveying direction V.

As is shown in FIGS. 10 and 11, the air current designated by the arrows 34 is generated in addition so that this air flows around the product (pasta) located in the vibrating oscillating channels 101 which is accordingly dried. The product is transported in direction V by means of the lifting movement of the vibrating element 102 in direction S resulting in a skipping motion of the product in direction V.

Each oscillating channel slopes upward corresponding to angle α relative to the horizontal line H so that the product is transferred from one vibrating oscillating channel to the following oscillating channel at dividing points. The angle α is empirically determined, but only amounts to a few degrees in principle.

The dividing points are transverse dividing walls 100 which, although they allow the product to pass from one oscillating channel to the other, substantially separate the zones C, D, E and F, respectively, from one another by means of air guidance technique so that each zone has its own climate and its own air circulation by means of a circulating air system according to FIG. 11 which is associated with each zone.

The vibrating elements 102 are provided at a channel frame 105 which receives a perforated channel base 106. As can be seen from FIG. 10, the channel frame 105 is supported in a springing manner on a supporting member 109 by means of pressure springs 110 to allow the aforementioned lift in direction S.

The longitudinal guides mentioned earlier are indicated by dashed lines 130.

To prevent dirt and dust from reaching blind spaces, the channel frame is connected on the one hand with a longitudinal dividing wall 112 of the whirl drier by means of a flexible seal 107 and on the other hand with the aforementioned supporting member 109 by means of a flexible seal 108, the supporting member 109 being fastened in turn at the longitudinal dividing wall 112.

A perforated collecting base 111 is fastened to the supporting member 109 below the perforated channel base 106.

Finally, the whirl drier has a heating element 11 in the side chambers 123 for heating up the circulating air and a circulating air ventilator 10.

The side chambers are covered externally by side walls 115 and the latter 115 tightly adjoin a base part 113 and a cover part 114.

The feed air is shown schematically by arrows Z and the exhaust air is shown by arrows A. This feed air and exhaust air is supplied and removed, respectively, by means of a duct which is divided into two parts 103 and 104.

Of course, the ducts of the feed air Z as well as the ducts of the exhaust air A are connected with the aforementioned duct 103; 104 in a manner not shown.

For the rest, identical members in FIGS. 9 and 10 are provided with the same reference numbers.

FIG. 11 shows the circulating air system, designated as "TURBOTERMATIK" [sic], for each whirl drier unit C, D, E, F, etc., in which identical members have the same reference numbers as in FIGS. 9 and 10.

It should be clarified at this point that an exhaust ventilator 117 sucks off a quantity of exhaust air from the exhaust air duct 103, which quantity is regulated by a regulator 132 and an air flap 121, while a feed air ventilator 118 blows feed air into the circulating air system, designated by 34, via an air humidifier 119, the amount of feed air being regulated by a regulator 131.

The feed air Z can be heated by means of a heating element 130 and the exhaust air can be heated by a heating element 130. The heating of the exhaust air serves to reduce the relative air humidity.

Reference is made to the aforementioned EP-OS 0 129 892 B1 with regard to the exact use of this so-called "Turbo-Thermatik".

To intensify the drying process a strong oscillation can also be transmitted to the air. Such oscillations can be generated by pulsating air. An example for generating such oscillations is known from DE-16 60 745 C2 (equivalent to U.S. Pat. No. 4,126,945) of the present Applicant.

Figure 12:
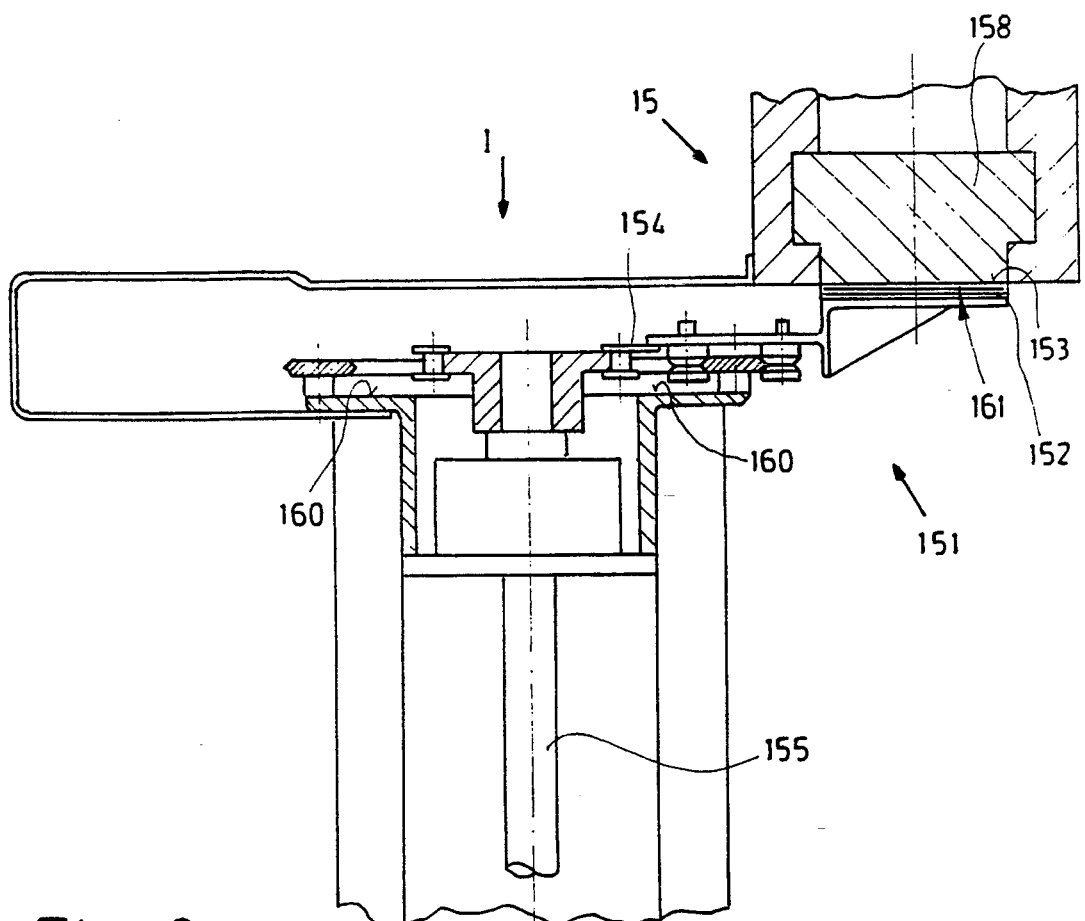
FIG. 12 is a partially schematic, cross-sectional view of a long die with a length cutting device.
Figure 13:
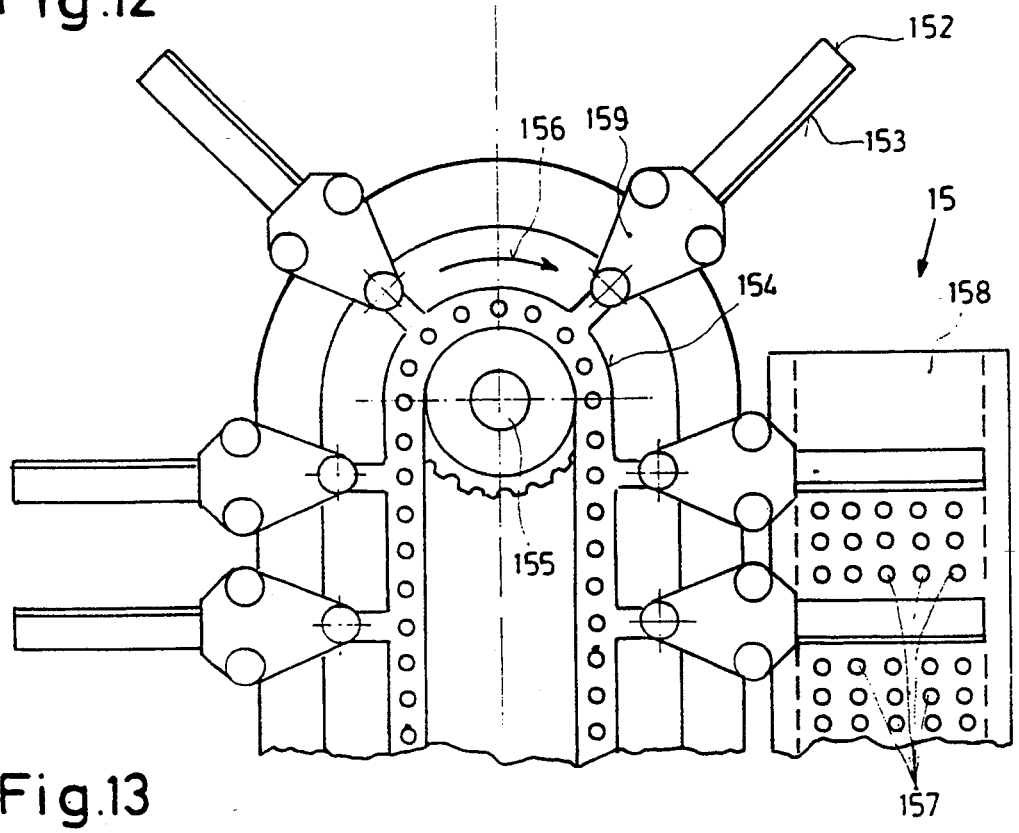
FIG. 13 shows the long die of FIG. 12 in a top view according to arrow I (FIG. 12)

FIGS. 12 and 13 show the aforementioned long die 15 with adjoining die cutting device 151.

The die cutting device 151 has cutting knives 152 which are arranged at an endless chain 154.

The cutting knives 152 have a cutting surface 153 which cuts in predetermined lengths, depending on the speed, through the pasta die bore holes 157 of the die 158 during the movement of the endless chain 154 in movement direction 156.

There is also the possibility of advancing the cutting knives continuously or in steps depending on the length of the pasta to be produced.

The endless chain 154 is driven by a drive (not shown) by means of a drive shaft 155.

The knives 152 are arranged at a supporting part 159 which is connected on the one hand with the endless chain 154 and is supported on the other hand on guide surfaces 160.

The knives are arranged in such a way that the cutting surfaces 153 cut the pasta while contacting the lower die surface 161.

The type of pasta, i.e. the length of the pasta, determines the number of knives 152 which are provided.

The shaft 155 is connected either with a step motor (not shown) and/or with a variable speed regulator (not shown) to vary the speed of the knives on the one hand and/or to carry out the aforementioned stepwise movement.

Obviously, both short and long pasta can be cut with the cutting device 151.

A substantial advantage of the process and device according to the invention consists in that the pasta can be fed to the climatized conveyor system without further lifting over immediately after the step.

Figure 14:
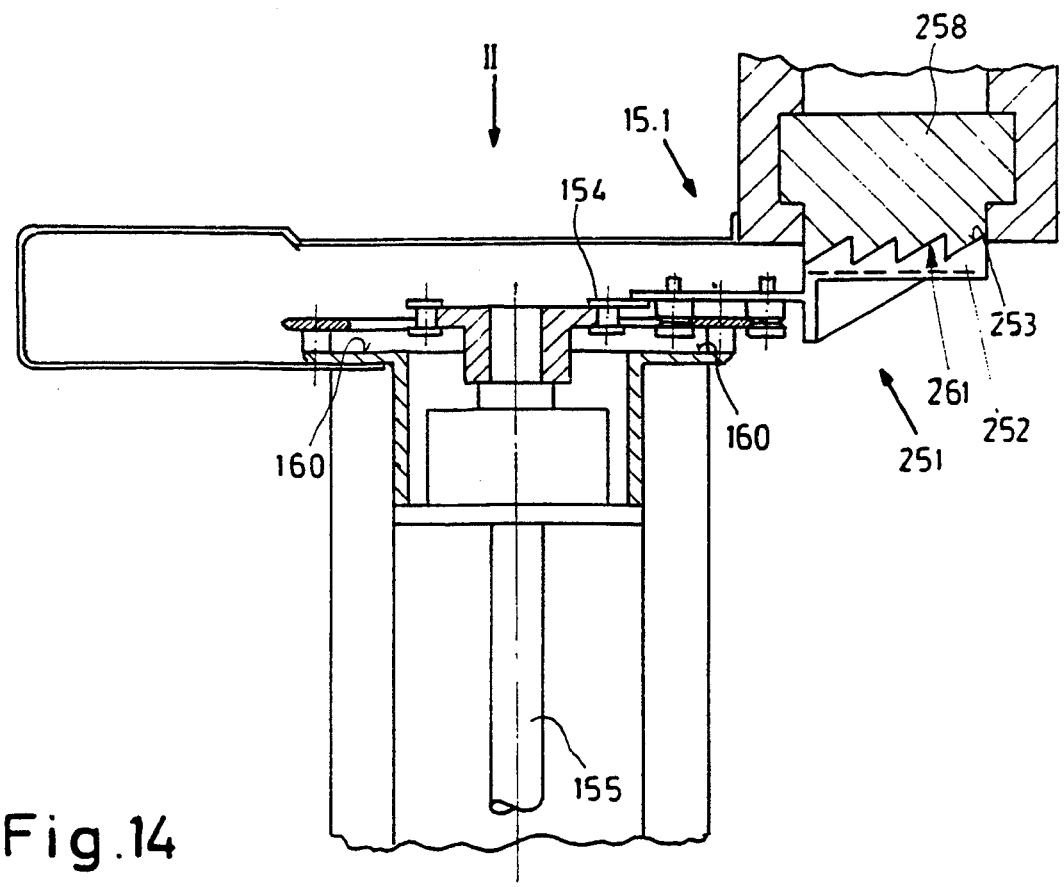
FIG. 14 shows a variant of the long die of FIG. 12.

FIG. 14 shows a die cutting device 251 with a long die 15.1 which differs from the cutting device 151 of FIG. 13 in that the die surface 261 and the cutting surface 253 are not straight as in FIG. 12, but rather have a sawtooth shape as can be seen in FIG. 14.

The other members having the same function are provided with the same reference numbers as in FIG. 12.

Figure 15:
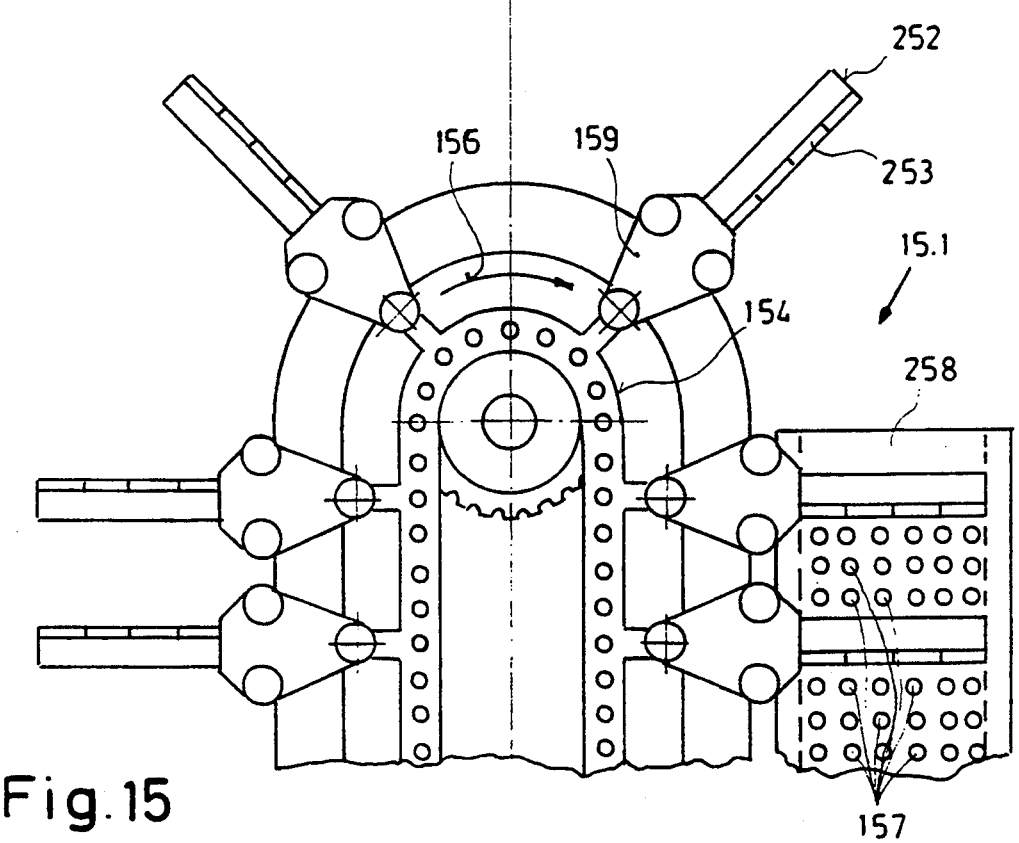
FIG. 15 shows a top view according to arrow II of FIG. 14.

The same is true for FIG. 15 which shows the pasta die bore holes as in FIG. 13. These pasta die bore holes 157 are distributed on the sawtooth die edge 261 in such a way that the pasta are severed diagonally by the cutting edge 253, which is designated as a "diagonal cut".

Figure 16:
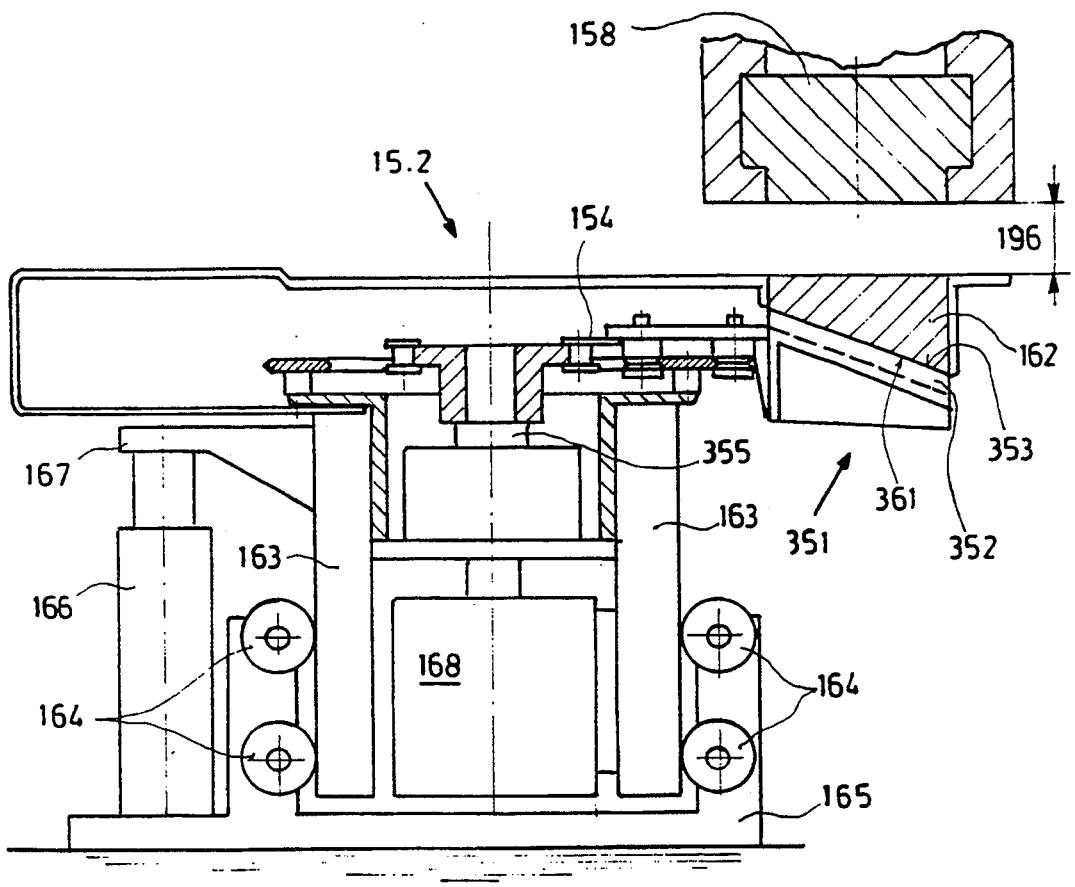
FIG. 16 shows another variant of a long die according to the invention similar to FIG. 12.

FIG. 16 differs from FIG. 12 in that the long die 15.2 is no longer part of the die cutting device 351, but is arranged so as to be separate from it. The die cutting device 351 likewise has a "diagonal cut", but as a linear diagonal cut rather than as a sawtooth as shown in FIG. 14. The diagonal die surface is designated by 361 and the diagonal cutting edge is designated by 353.

An intermediate die 162 is provided between the die 158 and the cutting knife 352 in order to cut this pasta at this intermediate die.

Such an intermediate die can also be used in connection with the die cutting device 251 in that the sawtooth die is made possible, and is even desired as will be explained subsequently, at an intermediate die (not shown) rather than directly at the die 258.

The endless chain 154 is driven by a motor 168 via a motor shaft 355.

As with all of the cutting devices, the guiding principle is that the number of knives depends on the cutting sequence and the speed of the pasta strand.

Figure 17:
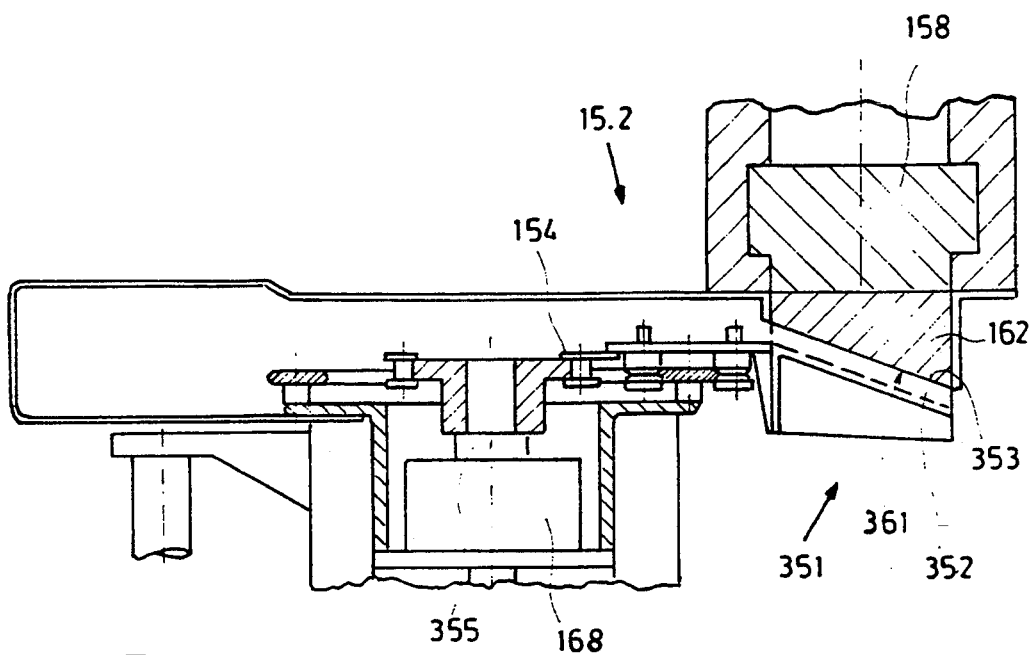
FIG. 17 shows an operating state of the device of FIG. 16.

In comparison to FIG. 16 where there is a distance 196 between the die 158 and the intermediate die 162, the intermediate die 162 contacts the die 158 in FIG. 17 which corresponds to the starting situation of the die cutting device 351, whereas FIG. 16 shows the operating die.

This operating die offers the possibility of arranging a cooling or venting zone within the intervening distance 196 depending on the dimensions of this distance.

To prevent the pasta strands exiting from the die 158 from encountering the intermediate die 162 in the position shown in FIG. 16, the intermediate die 162 is brought into the position according to FIG. 17 in the starting phase.

Moreover, the bore holes allowing the pasta strands to pass out of the die 158 are selected so as to be larger than the pasta die bore holes 157.

In contrast to the die cutting device 151 of FIGS. 12 and 14 in which the cutting devices are stationary per se, guides 163 are provided for the aforementioned displacement of the die cutting device 351 and in order to bring the intermediate die 162 into the position according to FIG. 17. Guide rollers contact these guides 163 in order to move the cutting device 351 up and down as seen in FIG. 16.

It goes without saying that guides 163 and guide rollers 164 are provided not only in the plane according to FIG. 16, but also in the plane vertical to the drawing plane in order to obtain a stable guidance.

The rollers 164 are rotatably supported in a stationary carrier 165 which likewise carries a cylinder-piston unit 166 which is combined on the piston side with an arm 167 which is fastened in turn by the guide 163 on the left-hand side as seen in FIG. 16, so that the guides 163 can be moved up and down, as seen in FIG. 16, along with the entire die cutting device 351 so as to bring the intermediate die 162 into the starting position, in which it contacts the die 158, and back into the operating position.

As can be seen from FIGS. 16 and 17, the intermediate die 162 is a component part of the cutting device 351.

Figure 18:
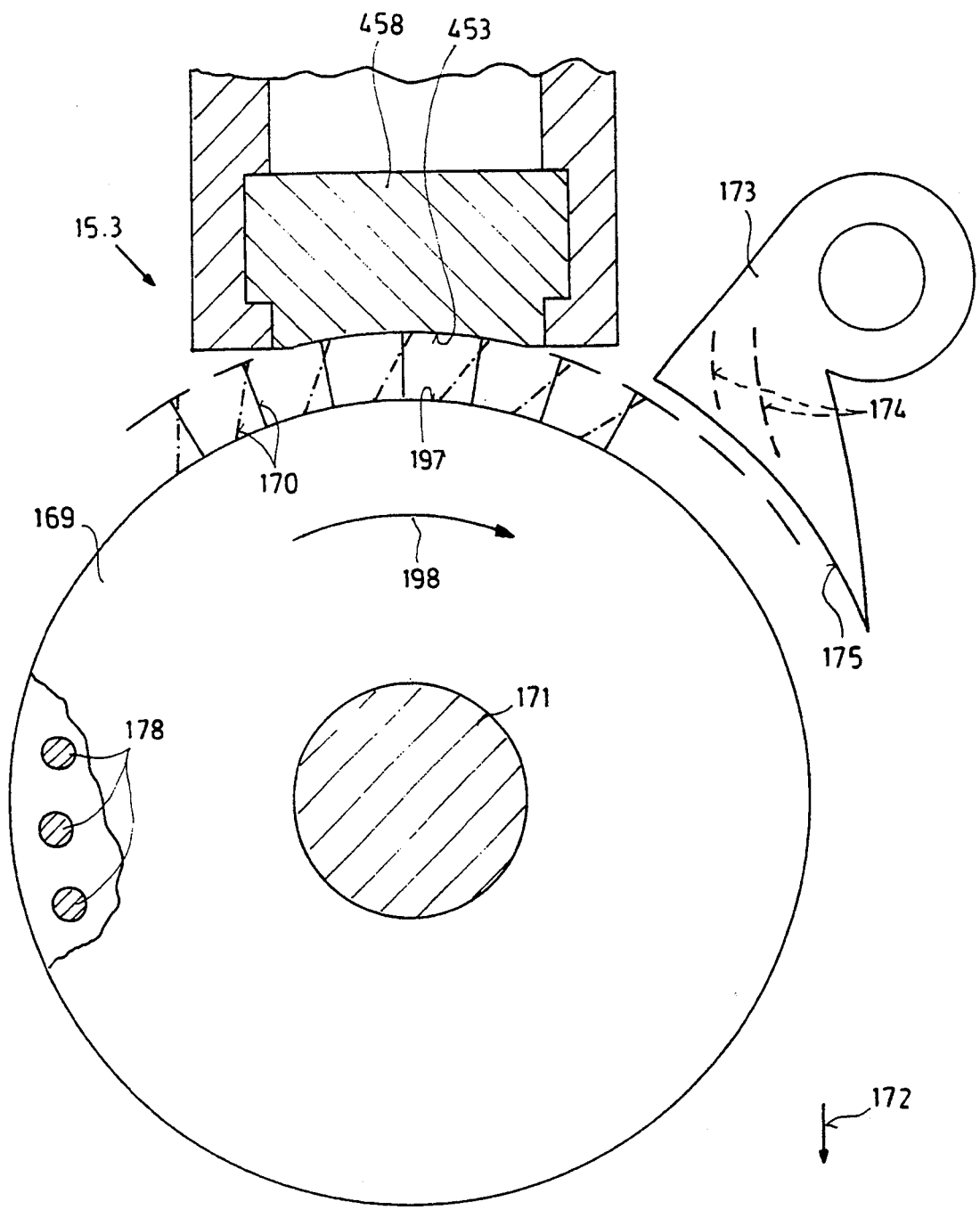
FIG. 18 is a partially schematic view of a variant of a cutting device according to the invention for a long die similar to FIG. 12.

FIG. 18 shows a long die 15.3 with a die 458 which differs from the die 158 of FIG. 12 in that the cutting edge or cutting surface has a concave curvature so that a cutting rotor 169 with a cutting knife 170 fastened thereto can be used for cutting the pasta at the die 453. In so doing, the cutting knives 170 can be positioned radially as shown in solid lines or diagonally as shown in dash-dot lines.

Severed pasta falls from the cutting knives 170 at the cutting surface 453 onto the rotor surface 197 and, owing to the rotation in the direction of arrow 198, finally in the direction of arrow 172 into the drier 8 described above.

The ventilator, designated by 173, shows that the rotor surface 197 can be ventilated either for drying or heating; in the latter case heated air must be sucked in by the ventilator.

Guide blades which ensure that the ventilator air escapes substantially uniformly from the air outlet 175 are designated by 174.

Three heating elements, designated by 178, show that the cutting rotor 169 can be heated as needed.

The rotor is rotatably supported and driven by a shaft 171.

Figure 19:
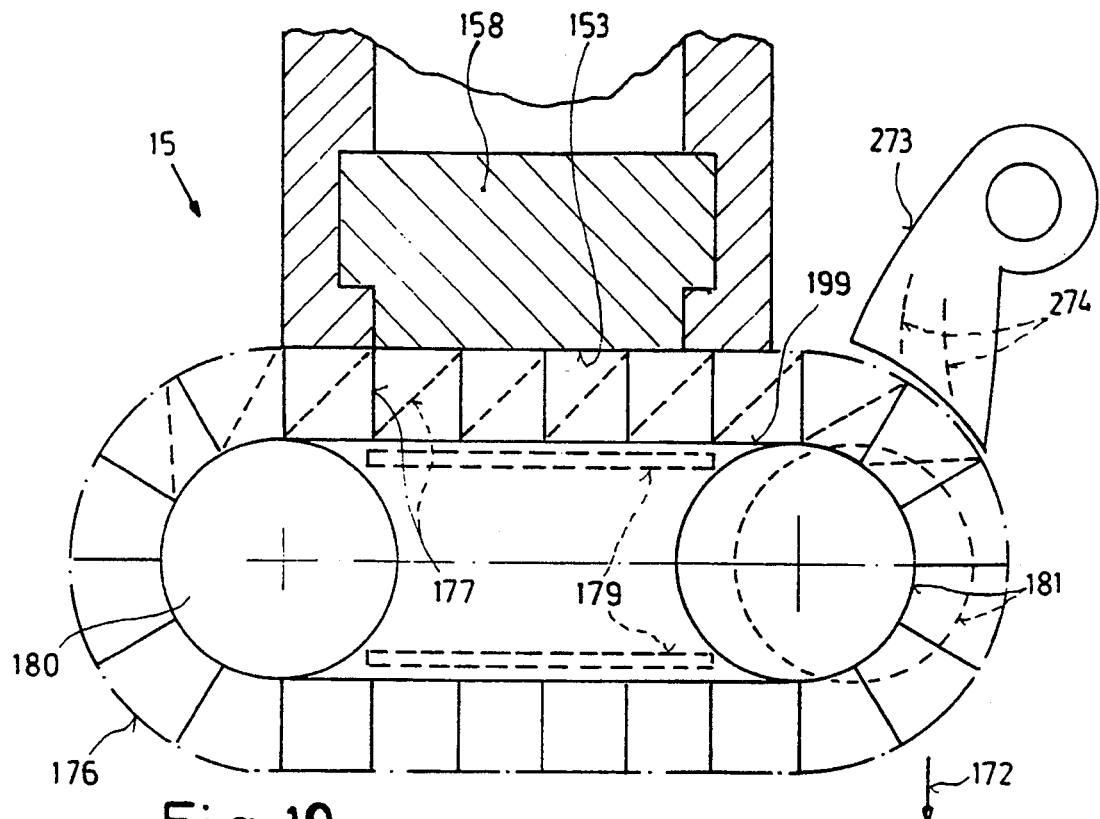
FIG. 19 shows another cutting device according to the invention with a long die according to FIG. 12.

FIG. 19 shows an alternative to the cutting device of FIG. 18 insofar as a cutting belt 176 is provided here instead of a cutting rotor. The cutting belt 176 is provided with knives 177 to cut the pasta at the cutting surface 153 of the die 158. In so doing, the knives can be arranged vertically relative to the belt according to the solid lines or diagonally according to the dashed lines.

The cutting belt 176 is guided at deflecting rollers 180 and 181 and can be driven by one of the two shafts.

The pasta goods falling on the belt surface 199 enter into the aforementioned drier 8 from the belt in direction 172 as a result of gravitational force.

A ventilator 273 can be provided with guide blades 274 in a manner similar to FIG. 18 to ventilate the surface and accordingly the pasta with warm or cool air and the length of the cutting belt 176 can be selected optionally as with the deflecting roller 181 shown in dashed lines so that the ventilation can be optionally selected in a corresponding manner by means of a ventilator 273 or also without a ventilator.

Heating elements are likewise designated by 179 and show that the belt 176 is heatable.

Figure 20:
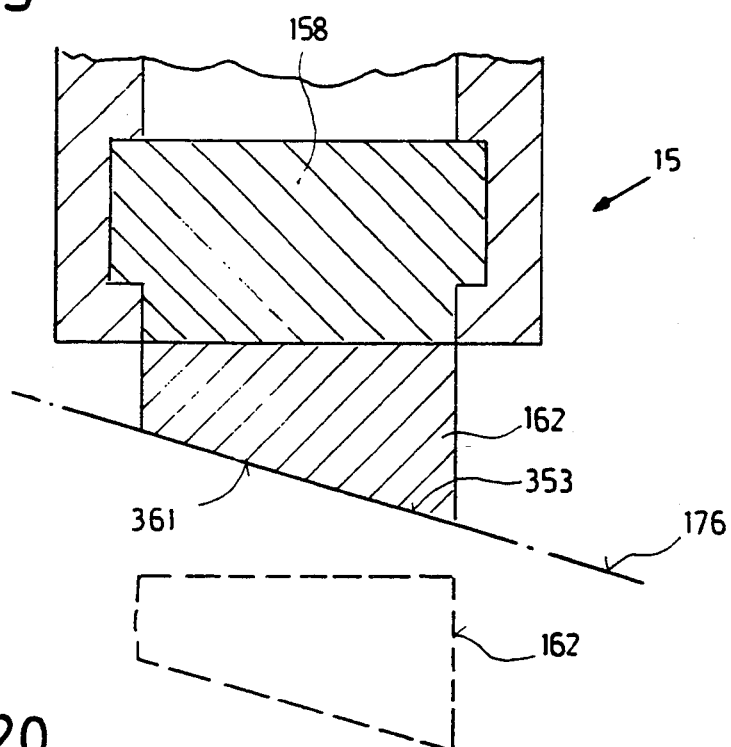
FIG. 20 shows a variant of the cutting device of FIG. 13.

An intermediate die 162 is provided in FIG. 20 in a manner similar to FIGS. 16 and 17 for the purpose of arranging the cutting belt 176 diagonally, as shown by the dash-dot line, to produce a diagonal cut as described earlier. The die surface 361 and the cutting surface 353 are accordingly also shown diagonally.

The intermediate die 162 shown in dashed lines shows that the intermediate die 162 can have a starting position and an operating position analogous to the description of FIGS. 16 and 17.

FIGS. 21 and 22 show a long die 15 at which a cutting knife 185 cuts transversely relative to the longitudinal direction of the long die in contrast to the knives 152 of FIGS. 12 and 13 which move in the longitudinal direction of the die for cutting.

For this purpose, the knife 185 is fastened at a telescoping arm 184 which is rotatably supported at a swivel pin 192 by means of a swivel bearing 187. The swivel pin 192 is part of a slide guide 193 which can slide along a slide rail which is provided in such a way that the swivel bearing 187 can move in a reciprocating manner along a movement path 200.

The aforementioned telescoping arm 184 telescopes so that the knife 185 can assume a diagonal position designated by an angle $\alpha$ or $\alpha.1$.

Stops 182 and 183 are provided at the long die 15 on the right-and left-hand sides, respectively, as seen in FIG. 21 in order to change the diagonal position according to $\alpha$ into the diagonal position according to $\alpha.1$.

The aforementioned change of position can be carried out by means of the telescoping arm 184 and the spring 191 provided therein as soon as the knife 185 contacts the corresponding stop 182 and 183, respectively, and the swivel bearing 184 is brought into the end position shown in FIG. 21.

To carry out the movement of the swivel bearing 187 along the movement path 200 the swivel bearing 187 is connected with a piston rod of a piston-cylinder unit (shown only in FIGS. 22 and 22.1) o The latter piston-cylinder unit is not shown in more detail and can be a completely standard reversible unit.

In order to fix the position of the knife 185 in the angle for moving along the cutting plane 153, which angle is shown by $\alpha$ or $\alpha.1$ in FIG. 21, a locking cam 188 (FIG. 21) is provided in the swivel bearing 187 and locking grooves 189 and 190 are provided in the swivel bearings 187 (FIG. 22.1), specifically in such a way that the knife 185 maintains the position designated by angle $\alpha$ or $\alpha.1$.

Since the sliding rails 194 themselves are stationary and relatively rigid, the telescoping arm must be flexible enough so that the locking cams 188 can be changed from the locking groove 189 to the locking groove 190 and vice versa for changing position.

The advantage of the knife 185 shown in FIG. 22 consists in that the stops 182 and 183 can be at the front sides of the long die rather than below it if desired.

Another possibility which is not shown in the drawings consists in that the round dies, known per se, with the rotating knives, by means of which short goods are produced in a manner known per se, can be arranged side by side in a row instead of a long die so that the pasta which is cut by the rotating knives likewise falls directly into the drier 8.

In addition, for the purpose of cutting the aforementioned moist pasta with region of the drier [sic], there is a cutting element, known per se, which is of the guillotine type and is arranged in the region in which the pasta still has the desired moisture. The position of this cutting machine must be determined on an individual basis. The cutting machine has a cutting knife extending over the entire width of the drier and a cutting plate which correspondingly extends over the entire width of e.g. 2 to 3 cm, over which the moist pasta are moved by means of the forward movement oscillating mechanism of the drier until the aforementioned knife cuts the advancing pasta with a very rapid cut at the correct preselected time. The forward feed of the pasta is effected at a speed of approximately 4 m per minute.

The cutting of the dried long goods, likewise mentioned in the preceding, is effected at the end of the line by cutting devices, likewise known per se, which are provided with cutters and e.g. cut the spaghetti to packaging length.

In summary, it is noted that the pasta can be cut directly at the die to desired lengths or in the region of the drier or at the end of the line.

While the foregoing description and drawing represent the preferred embodiments of the present invention, it will be obvious to those skilled in the art that various changes and modifications may be made therein without departing from the true spirit and scope of the present invention.

What is claimed is:

1. In a process for the production of pasta by extrusion of dough via an extrusion press having a die and subsequent drying in a continuous-flow drier having a predetermined width, the improvement comprising the steps of:

effecting the extrusion of dough over the width of the continuous-flow drier to produce extruded pasta goods and moving the goods substantially horizontally into said drier and drying them in a horizontally-extending fluid bed with said drier.

2. Process according to claim 1, including the step of cutting the goods to length directly at the outlet of the press directly at the die for the production of short goods or cutting them after partial drying for the production of long goods.

3. Process according to claim 1, including the steps of pressing the goods via a long die and feeding the goods directly to the fluid bed and drying them by a whirl drier.

4. Process according to claim 1, including the step of pressing the goods via a long die.

5. Process according to claim 1, including the steps of effecting the drying in said fluid bed by a number of individually controllable drying zones which are arranged one after the other and have an independent fluid bed circulating air system, and cooling the goods in a circulating air fluid bed after final drying.

6. Process according to claim 1, including the step of increasing the temperature of the goods to more than 70° C.

7. Process according to claim 2, including the steps of cutting the goods as hot strands after pre-drying at a temperature of at least 70° C. either into drying lengths or into finished product lengths and drying the goods in a warm state.

8. Process according to claim 7, including the steps of drying the goods only to a sufficient stability of shape to less than 28% moisture, and cutting the goods in a moist state.

9. Process according to claim 8, including the step of completely drying the cut goods to less than 13% product moisture.

10. Process according to claim 5, including the steps of effecting the drying in a number of drying stages including a principal drying stage, each stage having its own controllable climate management and its own circulating air system, and pre-drying the pasta goods is at a product temperature of more than 70° C., and effecting the principal drying at product temperatures of 80° C. to 150° C.

11. Process according to claim 10, including the steps of guiding the goods horizontally and guiding the drying air vertically at a right angle to the goods, wherein the air is pulsated or oscillated to enhance the drying process and the air speed is controlled so that the pasta goods are fluidized, wherein pasta goods are guided via a continuous conveying device.

12. In an apparatus for the production of pasta with a die press having an extrusion die and an adjoining continuous-flow drier, said drier having a predetermined width, the improvement comprising:

said die press extending substantially over the width of the drier for extruding dough to produce extruded pasta goods and that the drier is provided in a conveying direction as a fluid bed and as a conveyor drier extending in a horizontal plane for drying said extruded pasta goods, said drier being divided into different climate zones and having individually controllable circulating air fluid ends.

13. Apparatus according to claim 12, wherein a first cutting device is arranged directly at the die press and at least a second cutting device is arranged within or at the end of the drying zones for the production of both long or short goods on the same apparatus 14. Apparatus according to claim 12, wherein the die is constructed as a long die extending over the width of the drier.

15. In an apparatus for the production of pasta in the form of long goods and/or short goods having a moisture content of less than 13 percent by weight, said apparatus including a die press having an extrusion die and a continuous flow drier, the improvement comprising: means for feeding moist/plastic pasta dough, from the press over an entire width of the drier to produce extruded pasta goods, means for cutting said extruded pasta goods at the die or after at least one of a plurality of subsequent climate zones to a predetermined product length, means for guiding the extruded pasta goods continuously into the drier extending in a horizontal plane and having a plurality of climate zones, means for producing circulating air through said climate zones, and a system control unit for individually regulating or controlling each climate zone.

16. Apparatus according to claim 12 or 15, wherein a cutting device is associated with the extrusion die and which has knives which move in one direction extending over the width of the drier for cutting the extruded pasta goods.

17. Apparatus according to claim 12 or 15, wherein a cutting device is associated with the extrusion die and which has knives which move in one direction extending in the longitudinal direction of the drier for cutting the extruded pasta goods.

18. Apparatus according to claim 12 or 15, wherein individual dies are arranged, wherein a cutting device having a knife is provided for every circularly arranged pasta die bore hole, the knife of the cutting device moving circularly for cutting the extruded pasta goods.

19. Apparatus according to claim 16, wherein the knives only in the cutting direction and are moved away from the die after the last cut.

20. Apparatus according to claim 19, wherein the knives are moved in an endless movement.

21. Apparatus according to claim 20, wherein the knives are arranged at an endless chain.

22. Apparatus according to claim 20, wherein the knives are arranged at an endless belt.

23. Apparatus according to claim 20, wherein the knives are arranged at a roller.

24. Apparatus according to claim 22, wherein a heating device is provided for heating the endless belt.

25. Apparatus according to claim 22, wherein a device is provided for ventilating the surface of the endless belt.

26. Apparatus according to claim 17, wherein the knives for cutting the pasta are movable in a reciprocating manner at the die.

27. Apparatus according to claim 26, wherein the knives are moved in a linear guide.

28. Apparatus according to claim 26, wherein the knives are inclined relative to the cutting surface of the extrusion die.

29. Apparatus according to claim 13, wherein a second cutting device is provided which is movable at the speed of the extruded pasta goods during the cutting of the extruded pasta goods.

30. Apparatus according to claim 12, wherein a pasta guide is provided between the press and the drier, and wherein the cutting device cuts the extruded pasta goods at said pasta guide.

31. Apparatus according to claim 23 wherein a heating device is provided for heating the roller.

32. Apparatus according to claim 23 wherein a device is provided for ventilating the surface of the roller.

33. Process according to claim 6, including the step of increasing the temperature of the goods to more than 80° C.

34. Process according to claim 8, including the step of drying the goods to less than 25% moisture.

35. Process according to claim 10, including the step of pre-drying the pasta goods at product temperature of up to 80° C.

36. Process according to claim 10, including the step of effecting the principal drying at product temperatures of 90° C. to 125° C.

37. Process according to claim 11, wherein said continuous conveying device includes an air-permeable endless conveyor belt.

38. Process according to claim 11, wherein said continuous conveying device includes an air-permeable vibrating transporting unit.

39. Apparatus according to claim 12, wherein the die is constructed as individual dies extending over the width of the drier.

40. Process according to claim 7, wherein the drying of the goods in a warm state is effected by guiding them into the continuous-flow drier.

* * * * *